(12) United States Patent
Dai et al.

(10) Patent No.: US 10,422,885 B2
(45) Date of Patent: Sep. 24, 2019

(54) RAPID RECOVERY OF PRECISE POSITION AFTER TEMPORARY SIGNAL LOSS

(71) Applicant: Deere & Company, Moline, IL (US)

(72) Inventors: Liwen L. Dai, Torrance, CA (US); Min Wang, Tustin, CA (US); Soon Sik Hwang, Torrance, CA (US)

(73) Assignee: DEERE & COMPANY, Moline, IL (US)

( * ) Notice: Subject to any disclaimer, the term of this patent is extended or adjusted under 35 U.S.C. 154(b) by 336 days.

(21) Appl. No.: 15/288,371

(22) Filed: Oct. 7, 2016

(65) Prior Publication Data

US 2017/0269231 A1  Sep. 21, 2017

Related U.S. Application Data

(60) Provisional application No. 62/310,062, filed on Mar. 18, 2016.

(51) Int. Cl.
   *G01S 19/44*   (2010.01)
   *G01S 19/32*   (2010.01)
   *G01S 19/04*   (2010.01)

(52) U.S. Cl.
   CPC .............. *G01S 19/44* (2013.01); *G01S 19/04* (2013.01); *G01S 19/32* (2013.01)

(58) Field of Classification Search
   CPC ........... G01S 19/44; G01S 19/32; G01S 19/04
   USPC .................................................. 342/357.27
   See application file for complete search history.

(56) References Cited

U.S. PATENT DOCUMENTS

| | | | | |
|---|---|---|---|---|
| 5,323,322 A | * | 6/1994 | Mueller | G01S 5/0009 342/357.27 |
| 5,757,646 A | | 5/1998 | Talbot et al. | |
| 6,424,914 B1 | * | 7/2002 | Lin | G01C 21/165 342/357.29 |
| 7,119,741 B2 | | 10/2006 | Sharpe et al. | |

(Continued)

FOREIGN PATENT DOCUMENTS

EP   2759849 A1   7/2014

OTHER PUBLICATIONS

Chassagne, Olivier. "The Future of Satellite Navigation, One-Centimeter Accuracy with PPP", GNSS Forum, pp. 51-54, Mar.-Apr. 2012 [online] [retrieved on Aug. 31, 2016]. Retrieved from the Internet: <URL:http://www.insidegnss.com/auto/marapr12-Chassagne.pdf>.

(Continued)

*Primary Examiner* — Frank J McGue

(57) ABSTRACT

A real-time kinematic (RTK) filter uses the backup data to estimate a relative position vector between the mobile receiver at the first measurement time and the mobile receiver at the second measurement time and to provide recovery data associated with a satellite-differenced double-difference estimation for the mobile receiver between the first measurement time and the second measurement time. A navigation positioning estimator can apply the relative position vector, the backup data, the recovery data from the RTK filter, and received correction data with precise clock and orbit information on the satellite signals, as inputs, constraints, or both for convergence or resolution of wide-lane and narrow-lane ambiguities, and determination of a precise position, in accordance with a precise positioning algorithm.

27 Claims, 8 Drawing Sheets

(56) References Cited

U.S. PATENT DOCUMENTS

| | | | |
|---|---|---|---|
| 7,570,204 B1* | 8/2009 | McGraw | G01S 19/32 |
| | | | 342/357.27 |
| 7,961,143 B2 | 6/2011 | Dai et al. | |
| 8,368,590 B2 | 2/2013 | Vollath et al. | |
| 8,368,591 B2 | 2/2013 | Talbot et al. | |
| 8,542,146 B2 | 9/2013 | Vollath | |
| 9,057,780 B2 | 6/2015 | Bar-Sever et al. | |
| 9,128,176 B2 | 9/2015 | Seeger | |
| 9,146,319 B2 | 9/2015 | Leandro | |
| 9,841,506 B2* | 12/2017 | Brosius | G01S 5/0036 |
| 2005/0001762 A1 | 1/2005 | Han et al. | |
| 2005/0114023 A1* | 5/2005 | Williamson | G01C 21/165 |
| | | | 701/472 |
| 2008/0074319 A1 | 3/2008 | Han et al. | |
| 2009/0102708 A1* | 4/2009 | Dai | G01S 19/41 |
| | | | 342/357.24 |
| 2014/0015712 A1* | 1/2014 | Leandro | G01S 19/44 |
| | | | 342/357.27 |
| 2017/0269216 A1* | 9/2017 | Dai | G01S 19/44 |
| 2017/0269231 A1* | 9/2017 | Dai | G01S 19/32 |

OTHER PUBLICATIONS

Choy, Suelynn. "GNSS Precise Point Positioning: A Fad or the Future of Satellite Navigation and Positioning?" Lecture slides [online]. School of Mathematical and Geospatial Sciences Royal Melbourne Institute of Technology University, Australia, 2014 [retrieved on Aug. 31, 2016]. Retrieved from the Internet: <URL:http://www.fig.net/resources/proceedings/fig_proceedings/fig2014/ppt/TS05A/Choy.pdf>.

Murfin, Tony. "Hexagon's Acquisition of Veripos: Why Did This Go Down?" GPS World [online], Apr. 16, 2014 [retrieved on Aug. 31, 2016]. Retrieved from the Internet: <URL:http://gpsworld.com/hexagons-acquisition-of-veripos-why-did-this-go-down/>.

Murfin, Tony. "Look, No Base-Station!—Precise Point Positioning (PPP)." GPS World [online], Mar. 20, 2013 [retrieved Aug. 31, 2016]. Retrieved from the Internet: <URL:http://gpsworld.com/look-no-base-station-precise-point-positioning-ppp/>.

Laurichesse, Denis. "Innovation: Carrier-Phase Ambiguity Resolution, Handling the Biases for Improved Triple-Frequency PPP Convergence." GPS World, Apr. 3, 2015 [online], [retrieved Aug. 31, 2016]. Retrieved from the Internet: <URL:http://gpsworld.com/innovation-carrier-phase-ambiguity-resolution/>.

Dixon, Kevin. "StarFire: A Global SBAS for Sub-Decimeter Precise Point Positioning." NavCom Technology Inc., ION GNSS 19th International Technical Meeting of the Satellite Division [online], Sep. 26-29, 2006 [retrieved on Aug. 31, 2016]. Retrieved from the Internet: <URL:http://www.gdgps.net/system-desc/papers/starfire.pdf>.

Shi, Junbo and Gao, Yang. "A Comparison of Three PPP Integer Ambiguity Resolution Methods." GPS Solutions 18.4 [online], 2013, pp. 519-528 [retrieved on Aug. 31, 2016]. Retrieved from the Internet: <URL:http://link.springer.com/article/10.1007/s10291-013-0348-2>.

Leandro, R., et al. "RTX Positioning: The Next Generation of cm-accurate Real-Time GNSS Positioning." Trimble Terrasat GmbH [online brochure], Sep. 2012 [retrieved on Aug. 31, 2016]. Retrieved from the Internet: <URL:https://www.trimble.com/positioning-services/pdf/WhitePaper_RTX.pdf>.

Goode, Matthew. "New Developments in Precise Offshore Positioning." Ocean Business / Offshore Survey [online presentation], Apr. 15-16, 2015, Southampton, United Kingdom [retrieved on Aug. 31, 2016]. Retrieved from the Internet: <URL:http://www.oceanbusiness.com/wp-content/uploads/2015/04/1410_MatthewGoode.pdf>.

Ott, Lee. "Use of Four GNSS Systems in Operational Precise Point Positioning Service." Furgo Satellite Positioning [online presentation], 2015 [retrieved on Aug. 31, 2016]. Retrieved from the Internet: <URL:http://www.gps.gov/cgsic/meetings/2015/ott.pdf>.

Toor, Pieter. "Munich Satellite Navigation Summit 2014." Veripos, Ltd. [online presentation], Mar. 26, 2014 [retrieved on Aug. 31, 2016]. Retrieved from the Internet: <URL:URL:http://www.terrastar.net/files/docs/Munich_Summit_2014_-_PPP_Session_-_Pieter_Toor_-_VERIPOS.pdf>.

Jokinen, Altti Samuli. "Enhanced Ambiguity Resolution and Integrity Monitoring Methods for Precise Point Positioning." Centre for Transport Studies, Department of Civil and Environmental Engineering, Imperial College London [online thesis], Aug. 2014 [retrieved on Aug. 31, 2016]. Retrieved from the Internet: <URL:https://spiral.imperial.ac.uk/bitstream/10044/1/24806/1/Jokinen-A-2014-PhD-Thesis.pdf>.

"Real-time Service." International GNSS Service [online article], 2015 [retrieved on Aug. 31, 2016]. Retrieved from the Internet: <URL:http://www.igs.org/rts>.

"Introducing the IGS Real-Time Service (RTS)." International GNSS Service [online], 2015 [retrieved on Aug. 31, 2016]. Retrieved from the Internet <URL:ftp://igs.org/pub/resource/pubs/IGS_Real_Time_Service-131031.pdf>.

Duman, Angie, et al. "PPP: IGS Announces the Launch of RTS-IGS." xyHt [online], Apr. 20, 2015 [retrieved on Aug. 31, 2016]. Retrieved from the Internet: <URL:http://www.xyht.com/professional-surveyor-archives/ppp-igs-announces-the-launch-of-rts-igs/>.

Laurichesse, D.; Mercier, F.; and Berthias, J. P. "Real-time PPP with Undifferenced Integer Ambiguity Resolution, Experimental Results." Proceedings of the ION GNSS [online] Sep. 21-24, 2010 [retrieved on Aug. 31, 2016]. Retrieved from the Internet <URL:http://www.ppp-wizard.net/Articles/laurichesse_ion_gnss_2010_bdp.pdf>.

Blewitt, Geoffrey. "Carrier Phase Ambiguity Resolution for the Global Positioning System Applied to Geodetic Baselines up to 2000 km." Journal of Geophysical Research [online], vol. 94, No. B8, pp. 10187-10203, Aug. 10, 1989 [retrieved on Aug. 31, 2016]. Retrieved from the Internet: <URL:http://www.colorado.edu/ASEN/asen6090/blewitt.pdf#page=1&zoom=auto,-154,811>.

Banville, Simon. "Ambiguity Resolution." BlackDot GNSS [online], Apr. 25, 2015 [retrieved on Sep. 6, 2016]. Retrieved from the Internet <URL:http://www.blackdotgnss.com/2015/04/25/ambiguity-resolution/>.

Teunissen, P.J.G. "Towards a Unified Theory of GNSS Ambiguity Resolution." Journal of Global Positioning Systems [online], vol. 2, No. 1, pp. 1-12, 2003 [retrieved on Sep. 6, 2016]. Retrieved from the Internet <URL:http://citeseerx.ist.psu.edu/viewdoc/download?doi=10.1.1.454.4430&rep=rep1&type=pdf>.

Teunissen, P.J.G. "Least-Squares Estimation of the Integer GPS Ambiguities." International Association of Geodesy General Meeting, Section IV: Theory and methodology, Beijing, China, 1993 [online] retrieved on Sep. 6, 2016]. Retrieved from the Internet: <URL:http://citeseerx.ist.psu.edu/viewdoc/download?doi=10.1.1.475.9393&rep=rep1&type=pdf>.

"Hemisphere GNSS Debuts Atlas GNSS Correction Service." GPS World Staff. GPS World [online], Jun. 15, 2015 [retrieved on Sep. 6, 2016]. Retrieved from the Internet: <URL:http://gpsworld.com/hemisphere-gnss-debuts-atlas-gnss-correction-service/>.

Teunissen, P.J.G. "GNSS Ambiguity Bootstrapping: Theory and Application." Proceedings of International Symposium on Kinematic Systems in Geodesy, Geomatics and Navigation [online], pp. 246-254, Jun. 2001 [retrieved an Nov. 16, 2016]. Retrieved from the Internet <URL:http://www.ucalgary.ca/engo_webdocs/SpecialPublications/KIS%2001/PDF/0503.PDF>.

Teunissen, P.J.G. "Theory of Integer Equivariant Estimation with Application to GNSS." Journal of Geodesy [online], vol. 77, No. 7-8, pp. 402-410, 2003 [retrieved on Nov. 16, 2016]. Retrieved from the Internet <URL:http://link.springer.com/article/10.1007/s00190-003-0344-3>.

Wen, Zhibo, et al. "Best Integer Equivariant Estimation for Precise Point Positioning." Institute for Communications and Navigation 2012 Proceedings [online], pp. 279-282, Sep. 12-14, 2012 [retrieved on Sep. 6, 2016]. Retrieved from the Internet <URL:http://ieeexplore.ieee.org/xpls/abs_all.jsp?arnumber=6338525&tag=1>.

Shi, J., Gao, Y. "A Fast Integer Ambiguity Resolution Method for PPP." Proceedings of the ION GNSS [online], Nashville, TN, pp.

(56) References Cited

OTHER PUBLICATIONS 3728-3734, Sep. 17-21, 2012 [retrieved on Nov. 16, 2016]. Retrieved from the Internet <URL:https://www.ion.org/publications/abstract.cfm?articleID=10548>.

Teunissen, P.J.G. "The Least-squares Ambiguity Decorrelation Adjustment: A Method for Fast GPS Integer Ambiguity Estimation." Journal of Geodesy [online], vol. 70, No. 1-2 pp. 65-82, 1995 [retrieved on Nov. 16, 2016]. Retrieved from the Internet <URL:http://link.springer.com/article/10.1007/BF00863419>.

De Jonge, P. and Tiberius, C. "The LAMBDA Method for Integer Ambiguity Estimation: Implementation Aspects." Publications of the Delft Computing Centre [online], LGR-Series No. 12, pp. 1-47, Aug. 1996 [retrieved on Sep. 6, 2016]. Retrieved from the Internet <URL:http://www.citg.tudelft.nl/fileadmin/Faculteit/CiTG/Over_de_faculteit/Afdelingen/Afdeling_Geoscience_and_Remote_Sensing/pubs/lgr12.pdf>.

Chang, X. W., Yang, X. and Zhou, T. "MLAMBDA: A Modified LAMBDA Method for Integer Least-squares Estimation." Journal of Geodesy [online], vol. 79, No. 9, pp. 552-565, Dec. 2005 [retrieved on Sep. 6, 2016]. Retrieved from the Internet <URL:http://www.cs.mcgill.ca/~chang/pub/MLAMBDA.pdf>.

Baroni, Leandro and Kuga, Helio K. "Evaluation of Two Integer Ambiguity Resolution Methods for Real Time GPS Positioning." WSEAS Transactions on Systems 8.3, pp. 323-333, Mar. 2009 [retrieved on Sep. 6, 2016]. Retrieved from the Internet <URL:https://www.researchgate.net/profile/Helio_Kuga/publication/41146341_Evaluation_of_Two_Integer_Ambiguity_Resolution_Methods_for_Real_Time_GPS_Positioning/links/543687fe0cf2bf1f1f2bd8d1.pdf>.

Verhagen, Sandra. "The GNSS Integer Ambiguities: Estimation and Validation." Delft Institute of Earth Observation and Space Systems, Delft University of Technology, Jan. 31, 2005 [retrieved on Sep. 6, 2016]. Retrieved from the Internet <URL:http://repository.tudelft.nl/islandora/object/uuid:07c6f2be-3a70-42aa-97b3-894a5770454d/?collection=research>.

Lin, P. and Zhang, X. "Precise Point Positioning With Partial Ambiguity Fixing." Sensors [online journal], vol. 15, No. 6, pp. 13627-13643, Jun. 10, 2015 [retrieved on Sep. 6, 2016]. Retrieved from the Internet:<URL:http://www.mdpi.com/1424-8220/15/6/13627/htm>.

Verhagen, Sandra, et al. "GNSS Ambiguity Resolution: Which Subset to Fix?" IGNSS Symposium 2011, International Global Navigation Satellite Systems Society, University of New South Wales, Sydney, Australia, Nov. 15-17, 2011 [retrieved on Sep. 6, 2016]. Retrieved from the Internet:<URL:http://repository.tudelft.nl/islandora/object/uuid:075deb5b-5253-4daf-97be-f71265196l2b/?collection=research>.

Pan, L., Cai, C., Santerre, R. and Zhu, J. "Combined GPS/GLONASS Precise Point Positioning with Fixed GPS Ambiguities." Sensors [online journal], vol. 14, No. 9, pp. 17530-17547, Sep. 18, 2014 [retrieved on Sep. 6, 2016]. Retrieved from the Internet: <URL:http://www.mdpi.com/1424-8220/14/9/17530/htm>. <DOI:10.3390/s140917530>.

Gratton, L., Joerger, M. and Pervan, B. "Carrier Phase Relative RAIM Algorithms and Protection Level Derivation." Journal of Navigation [online], vol. 63, No. 2, pp. 215-231, Apr. 1, 2010 [retrieved on Sep. 6, 2016]. Retrieved from the Internet: <URL:https://www.cambridge.org/core/journals/journal-of-navigation/article/div-classtitlecarrier-phase-relative-raim-algorithms-and-protection-level-derivationdiv/4EA4489E97E3C131EBD3E2184B3F0DD7> <DOI:10.1017/S0373463309990403>.

"Trimble XFill RTK" Trimble Navigation Limited [online white paper], Sep. 2012 [retrieved on Sep. 6, 2016]. Retrieved from the Internet: < URL: http://trl.trimble.com/docushare/dsweb/Get/Document-630776/022543-551_Trimble%20xFill%20White%20Paper_1012_sec.pdf>.

NovAtelCORRECT. NovAtel Inc. [online brochure], Nov. 2015 [retrieved on Sep. 6, 2016]. Retrieved from the Internet: <URL:http://www.novatel.com/assets/Documents/Papers/NovAtelCORRECT-Brochure.pdf>.

Reußnerr, N. and Wanniger, L. "GLONASS Inter-frequency Code Biases and PPP Carrier-Phase Ambiguity Resolution." Geodetic Institute, Technische Universität Dresden, IGS Workshop, Jul. 2012 [retrieved Aug. 31, 2016]. Retrieved from the Internet: <URL:https://tu-dresden.de/bu/umwelt/geo/gi/gg/ressourcen/dateien/veroeffentlichungen/igs2012.pdf?lang=en>.

Sleewagen, J., et al. "Digital versus Analog: Demystifying GLONASS Inter-Frequency Carrier Phase Biases." Inside GNSS [online], May-Jun. 2012 [retrieved Aug. 31, 2016]. Retrieved from the Internet:<URL:http://www.insidegnss.com/auto/mayjune12-Sleewaegen.pdf>.

Carcanague, S., et al. "Finding the Right Algorithm Low-Cost, Single-Frequency GPS/GLONASS RTK for Road Users." Inside GNSS [online], vol. 8 No. 6, pp. 70-80, Nov./Dec. 2013 [retrieved Aug. 31, 2016]. Retrieved from the Internet:<URL:http://www.insidegnss.com/auto/novdec13-WP.pdf>.

Wang, J. and Feng, Y. "Reliability of Partial Ambiguity Fixing with Multiple GNSS Constellations." Journal of Geodesy [online], vol. 87, No. 1, pp. 1-14, Jun. 12, 2012 [retrieved Aug. 31, 2016]. Retrieved from the Internet<URL:http://link.springer.com/article/10.1007/s00190-012-0573-4> <DOI:10.1007/s00190-012-0573-4>.

The International Search Report and the Written Opinion of the International Searching Authority issued in counterpart application No. PCT/US2017/18251, dated May 3, 2017 (12 pages).

\* cited by examiner

RAPID RECOVERY OF PRECISE POSITION AFTER TEMPORARY SIGNAL LOSS

RELATED APPLICATION

This document (including the drawings) claims priority and the benefit of the filing date based on U.S. provisional application No. 62/310,062, filed Mar. 18, 2016, under 35 U.S.C. § 119 (e), where the provisional application is hereby incorporated by reference herein.

FIELD OF DISCLOSURE

This disclosure relates to a method and satellite receiver system for rapid recovery of precise position after temporary signal loss of one or more satellite signals.

BACKGROUND

In certain prior art, satellite navigation receivers, such as Global Navigation Satellite System (GNSS) receivers, can provide centimeter level estimates of position. Such satellite navigation receivers often rely upon carrier phase measurements that are subject to integer ambiguities of a cycle of the received satellite signal. In some prior art, long initialization periods, also known as pull-in times, are typically 30 to 45 minutes, driven by the time it takes for phase ambiguities to converge to near stable values and for the solution to reach its optimal precision. Prior to the satellite navigation receiver resolving the integer ambiguities of the carrier phase measurements, the precision of the position estimates is degraded.

In some prior art, real-time kinematic (RTK) correction data for the navigation receiver is locally valid, rather than globally valid and requires a significant investment in real-time kinematic base stations and communications links to support communications between a base station and a mobile satellite navigation receiver. RTK navigation applications typically have been restricted to a short range of about 20 kilometers to about 30 kilometers for single baseline between the base station and rover because of distance-dependent biases between the receiver and base station.

In other prior art, Precise Point Positioning (PPP) correction data is globally valid and supports determination of an accurate position solution without regional corrections from additional regional reference stations. However, because PPP correction data only includes the satellite-dependent portion of the measurement errors, prior art PPP methods can take longer time than conventional RTK methods to reach full positioning accuracy.

Under certain circumstances, such as the presence of trees, buildings, obstructions, terrain height changes, fading, or an interfering signal, a GNSS system employing a prior art PPP method may experience a loss or interruption of received (GNSS) satellite signal lock for short time (e.g., for a few minutes) and subsequently regain the signal after the brief loss or interruption. In response to the loss of signal lock and after the interruption, the prior art PPP estimator may reset such that a new convergence period (e.g., at least ten minutes and up to 30 to 45 minutes) is required for the PPP-based-GNSS system to recover back to the full positioning accuracy. Although some prior art attempts to use the last available position estimate prior to loss of lock, the assumption that the last available position estimate did not change materially during the interruption prior can be inaccurate. Accordingly, an operator of heavy equipment, agricultural equipment, construction equipment, forestry equipment or other work vehicle may have significant wasted downtime waiting for the signal to converge, instead of performing work tasks with the work vehicle.

Thus, there is need for a method and satellite receiver system for rapid recovery of precise position after temporary signal loss.

SUMMARY

In accordance with one embodiment, a mobile receiver is adapted to quickly or rapidly determine or recover a precise position based on historical data or backup data stored in a data storage device of the mobile receiver. A receiver module can receive a set of one or more satellite signals. A measurement module is capable of measuring the carrier phase of one or more received satellite signals for a first measurement time (e.g., $t_1$), a second measurement time (e.g., $t_2$), or both. An estimator is adapted to estimate a wide-lane ambiguity and narrow-lane ambiguity in the measured carrier phase of the one or more received satellite signals for the first measurement time and estimating tropospheric bias for one or more of the carrier satellite signals based on correction data. A data storage device is arranged to store, at regular time intervals for the first measurement time, backup data comprising a set of any of the following post-convergence or resolved values: the estimated wide-lane ambiguities (e.g., float or fixed values), fixed wide-lane ambiguities that are fixed to integer ambiguity values, the estimated narrow-lane ambiguities, fixed narrow-lane ambiguities that are fixed to integer ambiguity values, resolved narrow-lane ambiguities resolved to the combination of an integer value and real numbered value for a satellite signal, the estimated tropospheric delay bias, raw measured carrier phase of the received satellite signals, and corresponding estimated receiver positions. A loss or lack of reception is detected for one or more of the carrier signals for a loss time period. After the detected loss of lock once at least some carrier phase signals are reacquired, the measurement module is adapted to measure the carrier phase of one or more received satellite signals at a second measurement time. A real-time kinematic (RTK) filter uses the backup data to estimate a relative position vector between the mobile receiver at the first measurement time and the mobile receiver at the second measurement time and to provide recovery data associated with a satellite-differenced, double-difference measurements for the mobile receiver between the first measurement time and the second measurement time. A navigation positioning estimator can apply the relative position vector, the backup data, the recovery data from the RTK filter, and the correction data with precise clock and orbit information on the satellite signals, as inputs, constraints, or both for (rapid) convergence or (quick, efficient) resolution of wide-lane and narrow-lane ambiguities in accordance with a precise positioning algorithm. The navigation positioning estimator is adapted to estimate a precise position of the mobile receiver based on or derived from the historical resolved narrow-lane ambiguities and wide-lane ambiguities that are in a converged state or fixed state, where the above is implemented by a data processor of an electronic data processing system of the mobile receiver.

DETAILED DESCRIPTION

Figure 1A:
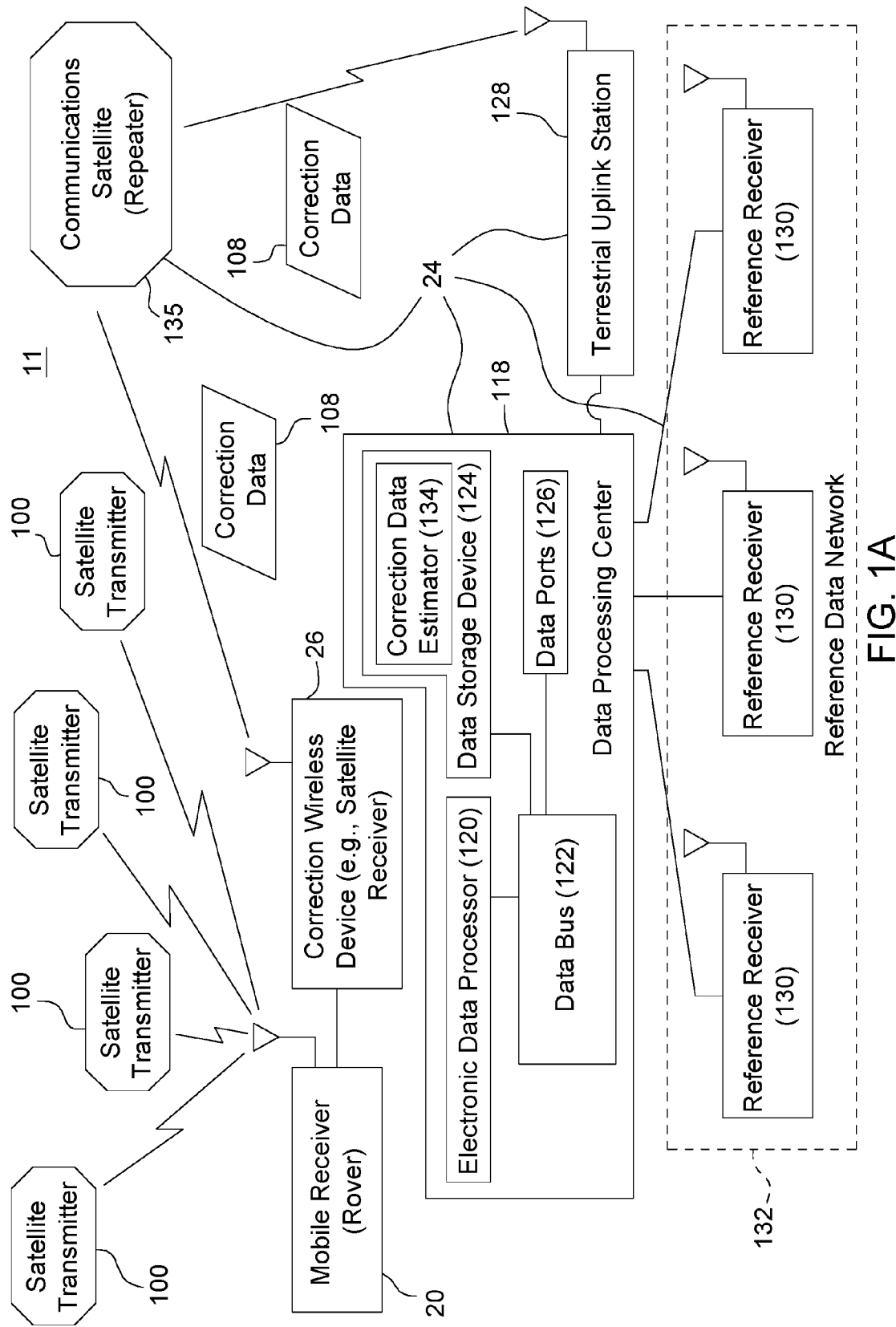
FIG. 1A is a block diagram of one embodiment of a navigation satellite receiver system for rapid determination of precise position by backup data, where the navigation satellite receiver can obtain correction data from a communications satellite.

A location-determining receiver, position-determining receiver, or satellite receiver, such as a Global Navigation Satellite System (GNSS) receiver, is capable of receiving carrier phase measurements that are subject to ambiguities, such as integer ambiguities, in the number of cycles or fractional cycles of the received satellite signal. An epoch or measurement time means a specific instant in time of a navigation satellite system or the time interval during which the mobile receiver measures the carrier phase (e.g., at a certain corresponding frequency or rate). As used in this document, a mobile receiver is synonymous with the term rover. The receiver determines or resolves ambiguities of carrier phase measurements to estimate accurately the precise position or coordinates of the receiver. Although the code phase or pseudo-range measurements of the GNSS receiver are not associated with integer ambiguities in the cycles of the received satellite, code phase measurements do not provide the centimeter level position accuracy required for certain applications. As used throughout this document, ambiguities are often specific to the context of particular equations (e.g., later described in this document) which relate to observations from one or more receivers of carrier phase signals from one or more satellites. Accordingly, it is possible to have wide-lane (WL) ambiguities, narrow-lane (NL) ambiguities, single-difference (SD) ambiguities, double-difference (DD) ambiguities, real-time-kinematic (RTK) ambiguities, and refraction-corrected (RC) ambiguities that relate to phase measurements from one or more receivers, or one or more satellites.

If the satellite navigation receiver can receive at least two frequencies, such as L1 and L2 frequencies, the difference of the L1 and L2 carrier phase measurements can be combined to form wide-lane (WL) measurement (e.g., with a wavelength of approximately 86.25 centimeters for GPS) and the sum of the L1 and L2 carrier phase measurements can be combined to form narrow-lane (NL) measurements (e.g., with a wavelength of approximately 10.7 centimeters). The wide-lane measurements facilitate quick and efficient resolution of wide-lane integer ambiguities, whereas the narrow lane measurements facilitate precise and accurate resolution of narrow-lane ambiguities with minimal phase noise. The refraction-corrected ambiguities eliminate the first order of ionospheric delay.

Single-difference measurements (e.g., of carrier phase or code phase) can be formed between two receivers and a satellite. For example, single difference measurements can be formed between a reference receiver 130 (at a known location) and one satellite and between a rover receiver and the satellite (e.g., to eliminate or reduce certain errors that are common to both receivers). Single difference measurements (of carrier phase or code phase) can be formed with respect to one receiver (e.g., reference receiver 130 or rover) and a pair of satellites (e.g., at the same observation time to reduce or eliminate receiver clock error).

Double-difference measurements can be formed by subtracting two related single-difference measurements. For example, double-difference measurements (e.g., of carrier phase or code phase) can be formed with respect to one satellite, a reference receiver 130 and a rover receiver 20 by subtracting two single difference measurements. Further, double-difference measurements can be formed with respect to two satellites and a rover receiver (e.g., 20), or by subtracting two single-difference measurement. In certain embodiments, differences may be taken at the same observation times or different observation times and for different frequencies or combinations of received satellite signals.

As used herein, ambiguities that are estimated, determined or "resolved" may have integer values, float values or real number values. Accordingly, estimated ambiguities, determined ambiguities and resolved ambiguities shall be regarded as synonymous terms in this document. In contrast, ambiguities that are "fixed" shall mean the ambiguities have integer values, unless otherwise specified, such as where ambiguities are divided into a fixed integer component and a real value component (float component). Converged ambiguities refer to integer or real valued ambiguities that are associated with reliable or steady-state accurate solutions or position estimates that are at or approach peak accuracy and acceptable standard deviation levels for a GNSS receiver operating in a GNSS.

The measurement module 56 or navigation receiver (e.g., 20) can measure or observe the L1 and L2 carrier phases and pseudo-ranges of the applicable Global Navigation Satellite System (GNSS) (e.g., Global Positioning System (GPS) or GLONASS) as shown in Equations (1-4) as follows:

$$P_1^j = \rho^j + \tau_r + \tau^j + T + b_{P_1} + B_{P_1}^j + I^j + \varepsilon_{P_1}^j \quad (1)$$

$$P_2^j = \rho^j + \tau_r + \tau^j + T + b_{P_2} + B_{P_2}^j + \frac{f_1^2}{f_2^2} I^j + \varepsilon_{P_2}^j \quad (2)$$

$$L_1^j = \quad (3)$$
$$\Phi_1^j \lambda_1 = \rho^j + \tau_r + \tau^j + T + b_{L_1} + B_{L_1}^j - I^j + N_1^j \lambda_1 + (W^j + w)\lambda_1 + \varepsilon_{L_1}^j$$

$$L_2^j = \Phi_2^j \lambda_2 = \quad (4)$$
$$\rho^j + \tau_r + \tau^j + T + b_{L_2} + B_{L_2}^j - \frac{f_1^2}{f_2^2} I^j + N_2^j \lambda_2 + (W^j + w)\lambda_2 + \varepsilon_{L_2}^j$$

where:
$P_i^j$ and $L_i^j$ are pseudo-range and carrier phase measurements (e.g., in meters), respectively, for a given frequency i (e.g., 1, 2, . . . , such as L1 or L2) and satellite j;
$\Phi_1^j$ is an ambiguous or non-integer phase measurement and $\lambda_1$ is the wavelength of the carrier phase measurement for frequency L1;

$\Phi_2^j$ is an ambiguous or non-integer phase measurement and $\lambda_2$ is the wavelength of the carrier phase measurement for frequency L2;

$\rho^j$ is the geometric distance (e.g., in meters) between the satellite j phase center and the receiver phase center including satellite orbital correction in the correction data 108, receiver tide displacement and earth rotation correction;

$\tau_r$ is the receiver r clock bias or error for a given GNSS system, where one receiver clock bias is estimated for each GNSS system such as GPS, GLONASS, Galileo or Beidou constellation;

$\tau^j$ is the satellite clock error for satellite j;

T is the tropospheric delay, and is divided into a dry component $T_{dry}$ and a wet component $T_{wet}$;

$b_{P_i}$ and $b_{L_i}$ are receiver dependent code bias and phase bias, respectively, for a given frequency i (1, 2, . . . ) and can be assumed to be same for each CDMA signal of all the visible satellites within each GNSS constellation;

$B_{P_i}^j$ and $B_{L_i}^j$ are satellite j dependent code bias and phase bias, respectively, for a given frequency i (1, 2, . . . ) which change very slowly over time;

$f_i$ and $\lambda_i$ are the GNSS carrier signal frequency i and its wavelength;

$I^j$ is the ionosphere error for a given satellite j;

$N_i^j$ is carrier phase integer ambiguity for a given frequency i and satellite j;

$W^j$ and w are phase windup errors for both satellite j and receiver, in cycles, respectively, which can be corrected with models;

$\varepsilon_{P_i}^j$ and $\varepsilon_{L_i}^j$ are code and phase errors, respectively, including white noise, multipath and remaining model errors for satellite j and frequency i.

In an alternate embodiment, an alternative approach for the receiver r clock bias, $\tau_r$, is the receiver r clock bias is to estimate one clock for a primary constellation such as GPS and then relative receiver clock biases between primary constellation and the other GNSS constellations.

For determination of the tropospheric delay, the dry component can be accurately modeled using an a priori troposphere model, such as the Global Pressure and Temperature model (GPT) or the GPT2 model; the remaining wet component, after removing an a priori wet model, can be further estimated as one zenith bias with elevation mapping function and/or additional two horizontal gradient coefficients.

If the measurement module 56 or receiver (e.g., 20) observes or measures GLONASS satellite signals, the different frequencies of different satellite transmitters 100 must be considered. For example, the satellite signals transmitted by GLONASS satellites can be derived from a fundamental frequency (1602 MHz for L1 band, 1246 MHz for L2 band) of the satellite L-Band. Each GLONASS satellite currently transmits on a different frequency using an FDMA technique. The equation to give the exact L1 center frequency is as follows:

$$f_1^j = 1602 \text{ MHz} + n^j \times 0.5625 \text{ MHz} \tag{5}$$

where $n^j$ is frequency channel number (n=−7, −6, . . . , 6) of satellite j. On the L2 band, the center frequency is determined by the equation $$f_2^j = 1246 \text{ MHz} + n^j \times 0.4375 \text{ MHz} \tag{6}$$

FIG. 1A is a block diagram of one embodiment of a satellite receiver system 11 for rapid determination of precise position by correction data 108 received wirelessly from a correction data source 24, backup data stored in a data storage device 62 (in FIG. 2) associated with the mobile receiver 20, and recovery data generated by relative positioning module 18 (in FIG. 2) or real-time kinematic filter associated with the mobile receiver 20. A correction data source 24 transmits correction data 108 via a wireless signal to the mobile receiver 20 or rover and the correction data 108 is received via a correction wireless device 26 associated with the mobile receiver 20.

In one embodiment, the correction data source 24 comprises an electronic system for generation and distribution of correction data 108. As illustrated in FIG. 1A, the correction data source 24 comprises a (global) reference data network 132, a data processing center 118, a terrestrial uplink station 128 and a communications satellite 135.

In one embodiment, reference receiver 130 measures the carrier phase of one or more of the carrier signals or received satellite signals from a set of satellite transmitters 100 on satellites orbiting the Earth. The reference receiver 130 can also measure the pseudo-range or code phase of a pseudorandom noise code that is encoded on one or more of the carrier signals from the set of satellite transmitters 100. The reference receivers 130 receive and send measurements, ephemeris data, other observables and any information derived from the deliverables to an electronic data processing center 118 (e.g., hub). In one embodiment, each reference receiver 130 transmits (e.g., via a communications link, a communications network, a wireless channel, a communications channel, communications line, a transmission line, or otherwise) a set of carrier phase measurements of received satellite signals, and associated satellite identifiers, and ephemeris data to an electronic data processing center 118 (e.g., reference data processing hub).

The data processing center 118 or its correction data estimator 134 determines correction data 108 (e.g., precise correction data) in real time based on the measurements, ephemeris data, other observables and any derived information received from one or more reference receivers 130. In one embodiment, the data processing center 118 comprises an electronic data processor 120, a data storage device 124, and one or more data ports 126 that are coupled to a data bus 122. The data processor 120, the data storage device 124 and the one or more data ports 126 may communicate with each other via the data bus 122.

Software instructions and data that are stored in the data storage device 124 may be executed by the data processor 120 to implement any of the blocks, components or modules (e.g., electronic modules, software modules, or both) described in this disclosure document. The data processor 120 may comprise a microcontroller, a microprocessor, a programmable logic array, an application specific integrated circuit (ASIC), a digital signal processor, or another device for processing data, manipulating, accessing, retrieving, and storing data. A data storage device 124 may comprise electronic member, non-volatile electronic memory, an optical storage device, a magnetic storage device, or another device for storing digital or analog data on a tangible storage medium, such as an optical disk, a magnetic disk, or electronic memory. Each data port 126 may comprise a buffer memory, a transceiver or both for interfacing with other network elements, such as a reference receiver 130 or a terrestrial satellite uplink station 128.

In one embodiment, the data processing center 118 or data processor 120 or correction data estimator 134 receives the phase measurements and corresponding satellite identifiers from the reference receivers 130, reference receiver identifiers (or corresponding coordinates) and processes the phase measurements to estimate a clock bias for each satellite, or rather each satellite signal, or a corresponding clock solution for incorporation into correction data 108. As illustrated in FIG. 1A, the clock solution, clock bias or correction data 108 is provided to a terrestrial uplink station 128 or another communications link. For example, the terrestrial uplink station 128 communicates or transmits the clock solution, clock biases or correction data 108 to a communications satellite 135 (e.g., repeater).

In turn, the communications satellite 135 transmits the correction data 108 to a correction wireless device 26 (e.g., a satellite receiver or L-band satellite receiver) at a mobile receiver 20. The correction wireless device 26 is coupled to a mobile receiver 20 (e.g., mobile GNSS receiver) or rover. The mobile receiver 20 also receives satellite signals from one or more GNSS satellites and measures the carrier phase (and code phase) of the received satellite signals. In conjunction with the phase measurements the precise orbit correction data, clock correction data, satellite wide-lane bias and satellite narrow-lane bias (e.g., for each satellite) in the correction data 108 can be used to estimate the precise position, attitude, or velocity (e.g., solution) of the mobile receiver 20, or its antenna. For example, the mobile receiver 20 may employ a precise point positioning (PPP) estimate using precise clock and orbital solutions for the received signals of the satellites.

Figure 1B:
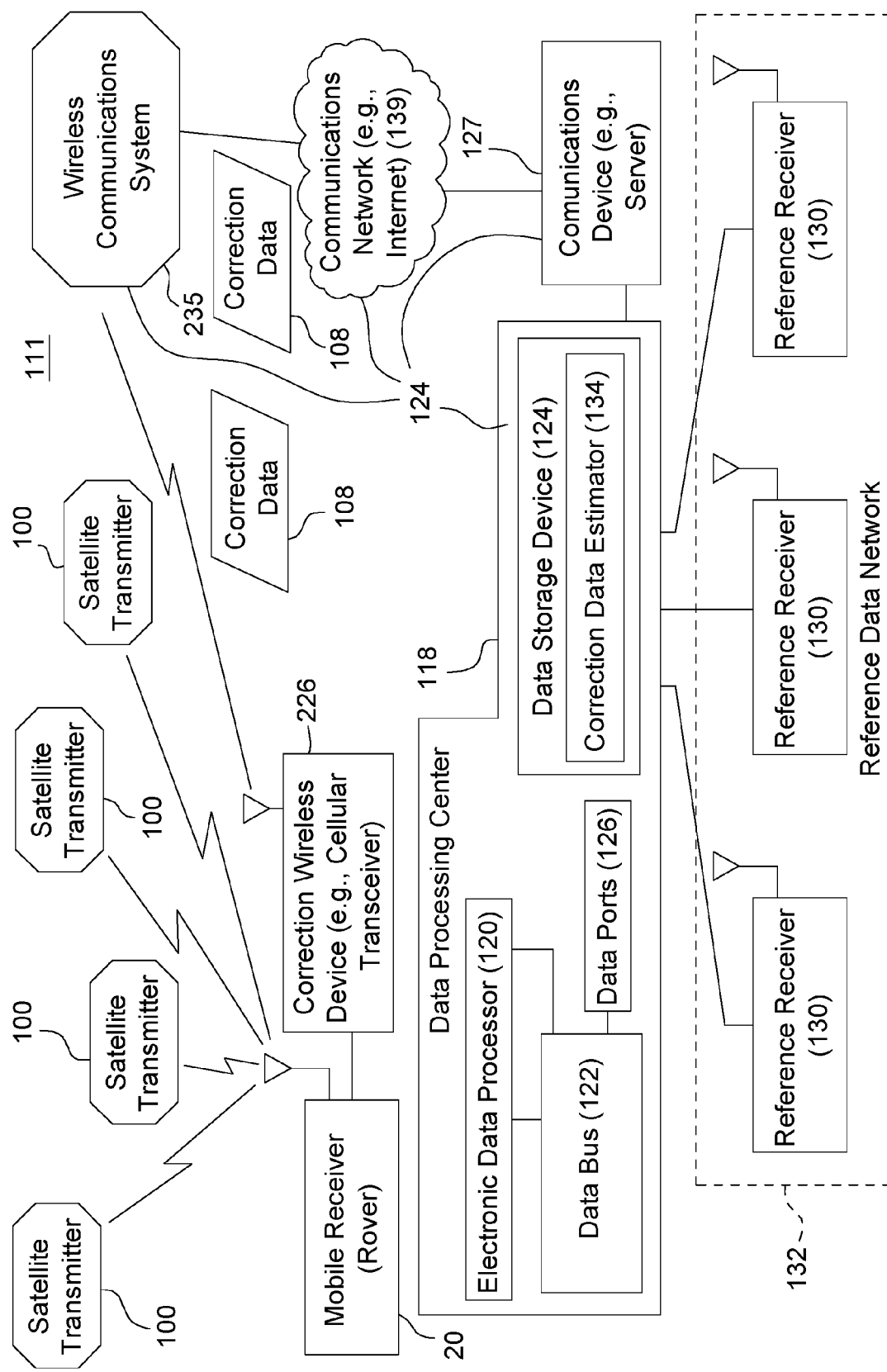
FIG. 1B is a block diagram of one embodiment of a navigation satellite receiver system for rapid determination of precise position by backup data, where the navigation satellite receiver can obtain correction data from a wireless communications network.

The system 111 of FIG. 1B is similar to the system 11 of FIG. 1A except the system of FIG. 1B replaces the communications satellite 135 and the terrestrial uplink station 128 with a communications device 127 (e.g., server), a communications network 139 (e.g., Internet or communications link), and a wireless communications system 235. Like reference numbers in FIG. 1A and FIG. 1B indicate like elements, modules or features.

As illustrated in FIG. 1B, the correction data source 124 comprises a reference data network 132, a data processing center 118, a communications device 127 and a wireless communications system 235. In one embodiment, the wireless communications system 235 may comprise a cellular communications system, a trunking system, a WiFi communications system, or another communications system. For example, the cellular communications system may comprise cell sites or base stations in communication with a base station controller, a router, or another mobile telephone switching office (MTSO), where the MTSO interfaces with a communications network 139, such as the Internet.

The communications network 139 may comprise microwave links, fiber optical links, the public switched telephone network (PSTN), the Internet, or another electronic communications network. In one embodiment, the communications device 127 comprises a server that formats, organizes or transmits the correction data in data packets (e.g., data packets compatible with TCP/IP Transmission Control Protocol/Internet Protocol) for transmission over the communications network 139. The communications network 139 communicates with the correction wireless device 226 (e.g., cellular transceiver) that is associated with or coupled to the mobile receiver 20.

In this document, under the precise positioning mode of FIG. 1A or FIG. 1B, the mobile receiver 20 can achieve centimeter-level accuracy positioning, by using the real-time global differential correction data 108. This correction data 108 is available and valid globally through either over satellite communications (e.g., L-Band geostationary communication satellite) in FIG. 1A or wireless communications system (e.g., cellular wireless system) in FIG. 1B. The global differential correction under a precise positioning mode, illustrated in the example of FIG. 1A or FIG. 1B, eliminates the need for local reference stations and radio communication that would otherwise be used to establish short baselines (e.g., less than approximately 20 kilometers to approximately 30 kilometers) between a reference receiver 130 and a mobile receiver 20 for precise position accuracy.

The correction data 108 may comprise precise orbit and clock corrections and any other satellite bias data that is necessary or useful to provide a precise point position (PPP) data services (e.g., with centimeter-level accuracy) to position-determining receivers in one or more geographic regions or throughout the world. The correction data 108 with additional satellite bias data enable mobile receivers 22 to quickly converge and pull-in to precise accuracy (e.g., centimeter level accuracy) or peak accuracy levels.

From time to time, any mobile receiver 20 may experience signal interruption of one or more satellite signals (from one or more satellite transmitters 100) for various reasons, such as signal propagation variation, electromagnetic interference, electromagnetic noise, signal attenuation, signal fading, multipath signal reception, tree obstructions, vegetation obstructions, terrain obstructions, building obstructions, the setting of a satellite from view or reception range, among other reasons. Obstructions refer to structures or objects that can attenuate or block propagation of the satellite signals between any satellite transmitter 100 and the mobile receiver 20. If a mobile receiver 20 or method of this disclosure experiences a temporary loss or interruption of one or more received satellite signals (e.g., GNSS signals) for short time (e.g., for a few minutes) and subsequently regains one or more of the received satellite signal after the brief loss or interruption, the receiver or method can employ an innovative technique of recovering the converged position solution (e.g., PPP solution or position estimate) rapidly to approximately the same level of accuracy before the signal interruption by estimating the differences of navigation states, such as position, carrier phase ambiguities, or the like. The above innovative technique may be referred to as a rapid recovery (RR) technique. In one embodiment, the rapid recovery technique allows a receiver to recover from the time gap in proper phase measurements of the received satellite signals, where the time gap is less than or equal to a maximum time period. For example, for a time gap or signal interruption of several minutes, the method or receiver 20 can recover a precise position estimate of the receiver almost immediately (e.g., within some seconds) based on reference to stored historical data, once the receiver resumes tracking of received satellite signals and generating phase measurements of the received satellite signals following the blockage event.

In this disclosure, the precise point positioning (PPP) algorithm can provide centimeter level accuracy, using the correction data 108, which includes a single set of clock and orbit corrections with global validity, generated from a sparse global network of reference stations. Unlike certain prior art real-time kinematic systems for providing correction data 108, PPP eliminates the need for a dense network of real-time kinematic (RTK) base stations and associated wireless communications links to support determination of correction data 108 with local validity or communications of a correction signal between an RTK base station and rover 200.

As illustrated in FIG. 1A and FIG. 1B, a reference position-determining receiver or reference receiver 130 receives satellite signals from a first set of satellites (e.g., satellite transmitters 100) within view or reliable reception range. In one configuration, a received satellite signal has a carrier signal that is encoded with a pseudo-random noise code or other spread-spectrum code.

The mobile position-determining receiver or rover 20 receives satellite signals from a second set of satellites (e.g., satellite transmitters 100) within view or reliable reception range. As used in this document, the terms rover 20 and mobile receiver 20 shall be synonymous. For the RTK algorithm executed by the relative positioning module 18, there needs to be commonality between the member satellites in the first and second sets of satellites within view or reliable range of the reference receiver 130 and the rover 20. However, for the PPP algorithm executed by the precise positioning module 16 in the rover 20, the rover 20 may use additional satellites that are not within the first set.

For the relative positioning module 18 or real-time kinematic (RTK) filter 48 to provide accurate results from recovery from a signal interruption, the mobile receiver 20 needs to be within a maximum range or distance from a first measurement time (e.g., $t_1$) to a second measurement time (e.g., $t_2$). For example, if the mobile receiver 20 has not moved by more than a maximum of range of zero to approximately thirty kilometers from the first measurement time to the second measurement time, the double difference equations used by the real-time kinematic filter 48 can provide accurate results. In alternate embodiments, if the mobile receiver 20 has not moved by more than a maximum of range of zero to approximately fifty kilometers from the first measurement time to the second measurement time, the real-time kinematic filter 48 can provide acceptable or adequate results. Accordingly, the relative positioning module 18 or real-time kinematic filter 48 may verify that the mobile receiver 20 has not moved by more than a range of zero to approximately thirty kilometers between the first measurement time and the second measurement time prior to applying the real-time kinematic (RTK) filter 48 to resolve ambiguities associated with double-difference carrier phase measurements.

The rover 20 is coupled to or in communication with a correction wireless device 26 that receives correction data 108 from the correction data source (24, 124) via the transmitted wireless correction signal.

As illustrated in FIG. 1A and FIG. 1B, the mobile receiver 20 attains a converged state with final precise accuracy after resolving ambiguities associated with the carrier phase signals based on the received correction data 108 in accordance with a precise point position algorithm or a precise positioning module 16.

In an alternate embodiment, the mobile receiver 20 attains a converged state with final precise accuracy at a first measurement time (e.g., $t_1$) after resolving ambiguities associated with the carrier phase signals based on the received correction data 108 in accordance with a real-time kinematic (RTK) positioning algorithm or other differential correction algorithm.

At any time after the mobile receiver 20 achieves the converged state, for ambiguity resolution of the carrier phase, the precise positioning module 16 or the navigation positioning estimator 50 stores one or more of the following backup data (e.g., including the resolved or converged ambiguity content) in the data storage device 62 associated with the mobile receiver 20: resolved wide-lane ambiguities (e.g., fixed integers or float, real-valued numbers); fixed wide-lane ambiguities that are fixed to integer ambiguity values; resolved narrow-lane ambiguities or resolved refraction-corrected ambiguities; estimated narrow-lane ambiguities (e.g., fixed integers or float, real valued numbers); fixed narrow-lane ambiguities that are fixed to integer ambiguity values; resolved narrow-lane ambiguities resolved to the combination of an integer value and real numbered value for a satellite signal, estimated tropospheric delay bias (e.g., residual tropospheric bias, tropospheric delay at zenith direction including the a priori model), raw measurements (e.g., phase or pseudo-range measurements), raw measured carrier phase, measured code phase of the received satellite signals, and mobile receiver position at the first measurement time (e.g., $t_1$). Generally, the resolved ambiguities comprise the pulled-in wide-lane and narrow-lane ambiguities from one or more GNSS satellites' carrier signals the absolute tropospheric delay at zenith direction including a priori model and residual tropospheric delay estimates. The pulled-in ambiguities are associated with position estimates that achieve steady-state accuracy approaching a peak precise accuracy, such as position estimates (e.g., less than five centimeters horizontal or pass-to-pass position accuracy) within acceptable standard deviation metrics (e.g., within one standard deviation) for a target percentage time reliability or availability (e.g., approximately 95 percent reliability).

At the mobile receiver 20 or rover, the relative positioning module 18 or the real-time kinematic filter 48 retrieves or reads the backup data after the temporary signal interruption or after the reception of one or more received satellite signals is restored; the relative positioning module 18 applies a real-time kinematic (RTK) algorithm to provide relative position vector between reference receiver 130 between the first measurement time and the second measurement time and recovery data. For example, the relative positioning module 18 uses double-difference of phase measurements between the reference receiver 130 and the rover 20 and two satellites to resolve double-difference RTK ambiguities, or related data, that are used as recovery data. At the rover 20, the precise positioning module 16 applies the relative position vector, the backup data, recovery data, and correction data 108 as inputs, constraints, or both for convergence of one or more predictive filters (38, 40, 44) on wide-lane and narrow-lane ambiguities (e.g., in accordance with a precise positioning algorithm). In one example, the recovery data comprises L1/L2 fixed double-difference (DD) ambiguities from the real-time kinematic filter 48 at the mobile receiver 20 based on raw phase measurements at the mobile receiver 20 and the reference receiver 130 for a respective pair of satellites. At the rover 20, the precise positioning module 16 or the navigation positioning estimator 50 estimates a precise position of the rover 20 based on or derived from the converged or fixed narrow-lane ambiguities and wide-lane ambiguities.

Figure 2:
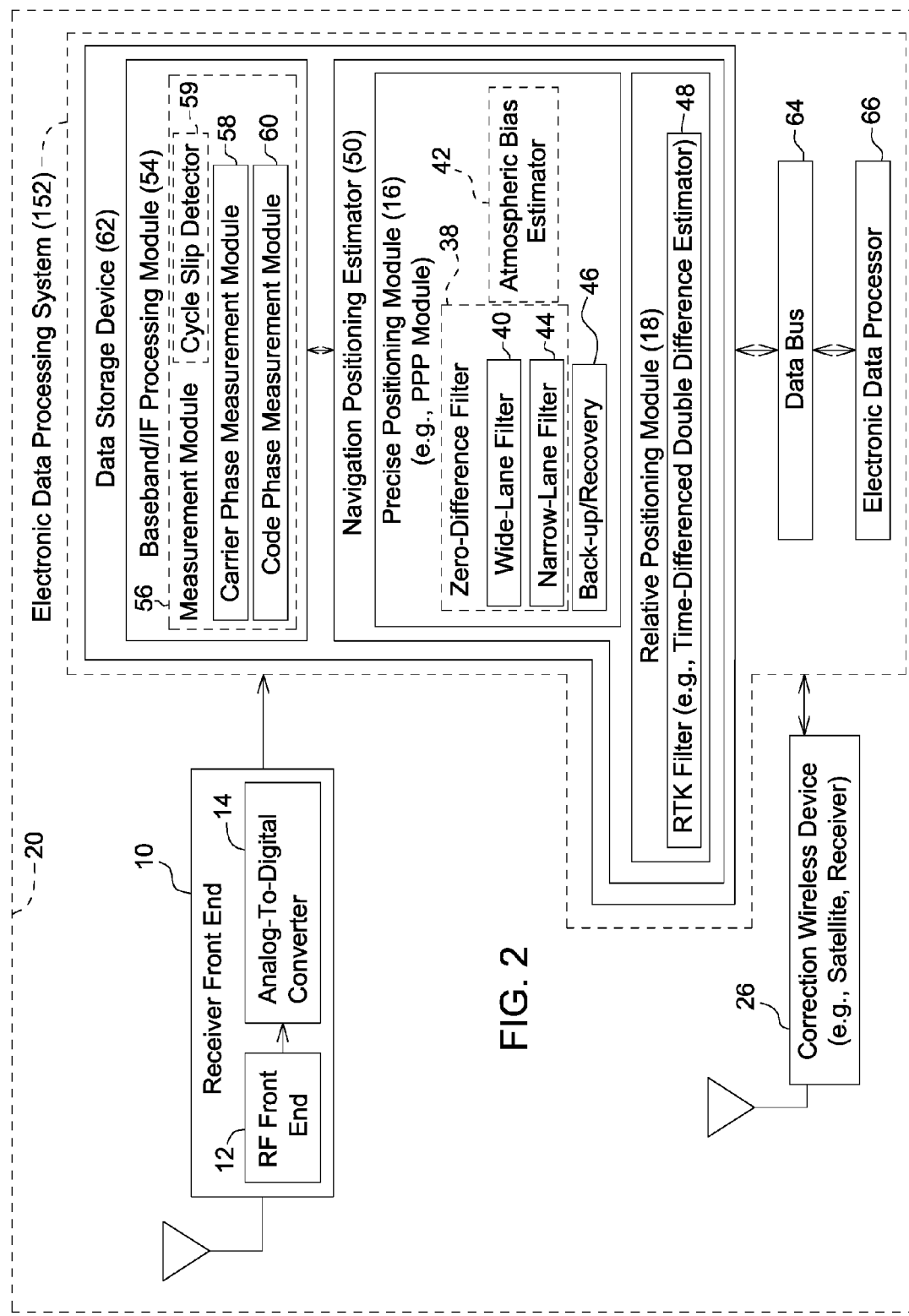
FIG. 2 is a block diagram of an illustrative example of satellite receiver shown in greater detail than FIG. 1.

FIG. 2 is a block diagram of an illustrative example of satellite receiver shown in greater detail than FIG. 1. The position determining receiver of FIG. 2 may be used as a reference receiver 130, a rover 20 or both.

In one embodiment, the mobile receiver 20 comprises a receiver front end 10 coupled to an electronic data processing system 152. The receiver front end 10 comprises an antenna, a radio frequency (RF) front end 12, and an analog-to-digital (A/D) converter 14. The RF front end 12 may include one or more of the following: an radio frequency amplifier or microwave amplifier, a filter (e.g., bandpass filter), and a downconverter for down-converting the received satellite signal to an intermediate frequency signal or a baseband signal.

The electronic data processing system 152 includes that portion of the receiver that processes data after the analog-to-digital conversion by the analog-to-digital converter 14. For example, the electronic data processing system 152 can comprise an electronic data processor 66, a data storage device 62 (e.g., electronic memory) and a data bus 64 for communication between the electronic data processor 66 and the data storage device 62, where software instructions and data are stored in the data storage device 62 and executed by the data processor 66 to implement any of the blocks, components or modules (e.g., electronic modules, software modules, or both) illustrated in FIG. 2. The mobile receiver 20 may comprise a location-determining receiver for: (a) determining a location or precise position (e.g. three-dimensional coordinates) of a receiver antenna, (b) a range-determining receiver for determining a range or distance between the receiver antenna and a satellite (e.g., satellite antenna) or (c) determining ranges between the receiver antenna and one or more satellites, or (d) determining position, velocity, acceleration, or attitude (e.g., yaw, pitch, roll) of the mobile receiver 20 or its antenna.

The analog-to-digital converter 14 converts the analog intermediate frequency signal or analog baseband signal to a digital signal. The digital signal comprises one or more digital samples that are available at a sampling rate. Each sample has a finite quantization level and each sample is capable of being processed by an electronic data processing system 152.

In one embodiment, the data storage device 62 stores the following modules or components: baseband/intermediate frequency processing module 54, measurement module 56, and navigation positioning estimator 50.

The baseband/intermediate frequency (IF) processing module 54 or measurement module 56 processes the digital signals. The measurement module 56 or a carrier phase measurement module 58 measures or detects the carrier phase of the received satellite signals from a set of GNSS satellites with view or reception range. For example, the measurement module 56 measures the carrier phase of the received signal by correlating the received digital signal to a locally generated reference signal. However, the measurement module 56 or carrier phase measurement module 58 measures the carrier phase of the satellite signals subject to an ambiguity or integer ambiguity in the number of cycles in any path between the receiver antenna and the satellite. The measurement module 56 or the code phase measurement module 60 measures the code phase or pseudo-range of the received satellite signals.

In one configuration, the measurement module 56 further comprises an optional cycle slip detector 59 that detects a cycle slip or loss of continuity in the tracking of the carrier phase of the received carrier signal from one or more satellites. For each satellite signal where a cycle slip is detected (e.g., by detector 59) and the received satellite signal is reacquired within a maximum time period, the rapid recovery process of this disclosure can be used to recover the ambiguity or rapidly converge on the new ambiguity, rather than restarting the ambiguity resolution process from scratch for that satellite signal and ignoring the received satellite signal until floating ambiguity or fixed integer ambiguity is reached. The optional nature of the cycle slip module 59 are indicated by its dashed lines.

The baseband/intermediate frequency processing module 54 is coupled to, or in communication with, the navigation positioning estimator 50. In one embodiment, the navigation positioning estimator 50 comprises a precise positioning module 16 (e.g., precise point positioning (PPP) module) and a relative positioning module 18.

In certain embodiments, the precise positioning module 16 represents a PPP estimator. The precise positioning module 16 can execute a precise point positioning algorithm to estimate a precise position of the receiver or its antenna based on received correction data 108 via the correction wireless device 26. In general, in one embodiment the precise positioning module 16 comprises a predictive filter, such as a Kalman filter or modified Kalman filter.

In one embodiment, the precise positioning module 16 may comprise an optional zero-difference filter 38, a wide-lane filter 40, a narrow-lane filter 44, a backup/recovery module 46, and an optional atmospheric bias estimator 42. The zero-difference filter 38 and the atmospheric bias estimator 42 are indicated as optional by the dashed lines in FIG. 2. Although the zero-different filter 38 may comprise a wide-lane filter 40 and a narrow-lane filter 44 as illustrated, the precise positioning module 16 can realize one or more single-difference filters or double-difference filters for the wide-lane ambiguity resolution, narrow-lane ambiguity resolution, or resolution of ionosphere-free ambiguities.

In one embodiment, the precise positioning module 16 comprises a precise point positioning module that operates in accordance with a precise point positioning algorithm. For illustrative purposes, the following equations can be used to implement one possible embodiment as follows.

The observation model that has been widely used for PPP is based on ionosphere-free code and carrier phase observations that eliminate the first order of ionosphere error as shown in Equations (1-4). The observations, such as carrier phase and code phase measurements, received from all the satellites are processed together in one or more predictive filters (e.g., Kalman filters, or the combination of a wide-lane filter 40 and a narrow-lane filter 44) that solves for the different unknowns, namely the receiver coordinates, the receiver clock, the zenith tropospheric delay and the phase floating ambiguities. The accuracy of the satellite clocks and orbits is one of the most important factors affecting the quality of the PPP solution. In order to achieve its full potential to applications, PPP faces two major challenges including a long initialization time and robust and reliable integer ambiguity resolution to derive a more precise solution.

In one embodiment, the wide-lane filter 40, which can be applied to PPP determination, uses the following equations described below. Given the code and phase measurements from two frequencies, such as L1 and L2 for GPS, G1 and G2 for GLONASS, the Melbourne-Wübbena linear combination $L_{WL}^j$ can be formed as shown below.

$$L_{WL}^j = \left(\frac{f_1}{f_1+f_2}P_1^j + \frac{f_2}{f_1+f_2}P_2^j\right) - \left(\frac{f_1}{f_1-f_2}L_1^j - \frac{f_2}{f_1-f_2}L_2^j\right) \quad (7)$$

By expanding the above equation (7) using Equations (1)-(4), it can be shown that the geometric range related terms, which include range, receiver and satellite clock, ionosphere and troposphere errors and the phase wind-up term, are cancelled. It can be expressed in Equation (8) as $$L_{WL}^j = N_{WL}^j \lambda_{WL} + b_{WL} + B_{WL}^j + IFB^j + \varepsilon_{WL}^j \quad (8)$$

where:
$\lambda_{WL}$ is wide-lane wavelength, about 86.4 cm for GPS and c is speed of light, $$\lambda_{WL} = \frac{c}{f_1 - f_2}; \quad (9)$$

$N_{WL}^j$ is integer wide-lane ambiguity for satellite j, $$N_{WL}^j = N_1^j - N_2^j; \quad (1)$$

where $b_{WL}$ is wide-lane receiver bias (one per receiver and constellation for all visible satellites), which is a combination of L1 and L2 receiver code bias and phase bias, as indicated in Equation (11):

$$b_{WL} = \left(\frac{f_1}{f_1+f_2}b_{P_1} + \frac{f_2}{f_1+f_2}b_{P_1}\right) - \left(\frac{f_1}{f_1-f_2}b_{L_1} - \frac{f_2}{f_1-f_2}b_{L_2}\right), \quad (11)$$

where majority of GLONASS inter-frequency bias $b_{P_1}$ and $b_{P_2}$ in code measurement is usually assumed to be linear or a trigonometric function of the GLONASS satellite frequency number; it is not the same for all the visible satellite as with the case of CDMA signals such as GPS;

where $IFB^j$ is the inter-frequency bias for satellite j, such as for a GLONASS satellite;

where $B_{WL}^j$ is wide-lane satellite j bias (one per satellite); and where $\varepsilon_{WL}^j$ is the wide lane measurement error for satellite j including white noise, multipath and remaining un-modeled errors.

With respect to the inter-frequency bias per satellite, the linear model can be approximated below for GLONASS constellation as Equation (12):

$$IFB^j \approx k \cdot n^j \quad (12)$$

where k is the IFB coefficient for receiver code bias. The IFB varies from receiver to receiver, also varies from one siting (antenna and cabling setup) to another siting. Modelled in this way, typically k is less than 0.1.

The wide-lane satellite j bias, $B_{WL}^j$, (one per satellite) is a combination of L1 and L2 satellite code bias and satellite phase bias as in Equation (13); the satellite bias is changing slowly over time; both satellite and receiver wide-lane biases are not constant over time:

$$B_{WL}^j = -\left(\frac{f_1}{f_1+f_2}B_{P_1}^j + \frac{f_2}{f_1+f_2}B_{P_2}^j\right) + \left(\frac{f_1}{f_1-f_2}B_{L_1}^j - \frac{f_2}{f_1-f_2}B_{L_2}^j\right) \quad (13)$$

where $B_{P_1}^j$ is satellite bias for satellite j of the code phase or pseudo-range signal encoded on frequency L1 ($f_1$), where $B_{P_2}^j$ is satellite bias for satellite j of the code phase or pseudo-range on frequency L2 ($f_2$), where $B_{L_1}^j$ is satellite bias for satellite j of the carrier phase on frequency L1, where $B_{L_2}^j$ is satellite bias for satellite j of the carrier code on frequency L2.

An optional zero difference filter can be used to determine undifferenced or zero-differenced (ZD) ambiguity states or float ambiguity states associated with the carrier phase measurements of the received satellite signals. The zero difference filter 38 is illustrated in dashed lines in FIG. 2 to show that the zero difference filter 38 is optional and may be included within the wide-lane filter 40 in alternate embodiments. For example, the zero-differenced ambiguity state can be determined based on correction data 108 that contains satellite bias information from a network or group of reference receivers 20.

The wide-lane filter 40 uses zero-differenced (ZD) Melbourne-Wübbena linear combination $L_{WL}^j$ in Eq. (7) as the input measurement to estimate one wide-lane floating ambiguity state $N_{WL}^j$ per visible satellite. The wide-lane satellite bias $B_{WL}^j$ can be broadcast in real-time within correction data 108 or correction signals to mobile receivers and will compensate for that term using Equation (8).

The precise positioning module 16 or wide-lane filter 40 lumps the receiver wide lane bias $b_{WL}$ into float WL ambiguity state $N_{WL}^j$. Accordingly, the ZD WL ambiguity does not hold an integer characteristic because all of the ZD WL ambiguities include the common receiver wide lane bias. However, the single differenced (SD) wide-lane ambiguities between satellites within each constellation (e.g., GPS constellation) at a mobile receiver or reference receiver are still integers and can be resolved in accordance with SD equations. Further, DD narrow-lane ambiguities, the DD wide-lane ambiguities, or the DD L1/L2 ambiguities between measurement times (or between epochs) within each constellation are still integers and can be resolved in accordance with double difference equations formed by subtraction of two SD observations with the benefit of receiver bias cancellation. For the GLONASS constellation, the additional inter-frequency bias (IFB) state may be required in order to preserve the integer nature of the SD ambiguities.

Given that the actual ZD float ambiguity state variable is the sum of ZD integer ambiguity and receiver bias, as explained above, dynamic update for the receiver bias variance needs to be included in the process noise model for the ZD ambiguity states as shown below in Equation 14 as follows:

$$Q_{WL}(t) = Q_{WL}(t-1) + \begin{pmatrix} 1 & \cdots & 1 \\ \vdots & \ddots & \vdots \\ 1 & \cdots & 1 \end{pmatrix} q_{b_{WL}} \cdot \Delta t \quad (2)$$

where $Q_{WL}$ is the time-varying receiver bias variance for the wide-lane ambiguities, $q_{b_{WL}}$ is the process noise associated with a matrix of ones or all-ones matrix, and $\Delta t$ is the time interval between time t−1 and t.

Equation (8) will be used for wide-lane filter 40. The zero differencing wide-lane raw observation is used for the measurement update in the wide-lane filter 40. The state variables include one float wide ambiguity per visible satellite, each conceptually including the wide-lane integer ambiguity and common receiver phase bias for the respective constellation.

In the navigation positioning estimator 50 of the mobile receiver 20, the wide-lane filter 40 will begin processing even before the satellite wide-lane (WL) bias correction from the correction data 108 is received or even if the satellite WL bias correction is invalid. The float wide-lane (WL) ambiguity is reduced by the satellite wide-lane bias correction when the satellite WL bias correction becomes valid (e.g., makes a transition to valid from invalid states). Likewise, the satellite WL bias is removed from the float wide-lane ambiguity (and the satellite WL bias is increased) when the satellite wide-lane bias becomes invalid (e.g., makes a transition from valid to invalid states).

In one embodiment, in the navigation positioning estimator 50 or the wide lane filter 40, the float ambiguity will be adjusted whenever +/−2 cycle jumps of the satellite wide-lane (WL) bias are detected, which indicates a transition between valid and invalid states. The above adjustment of the satellite wide-lane bias is limited to deviations of +/−2 cycles deviations to reduce the bandwidth or resources required for data processing. As described above, the between-satellite single differencing ambiguity resolution for each constellation can be conducted, which is the equivalent of double-differencing ambiguity resolution. The satellites without a valid satellite wide-lane bias will be skipped by the ambiguity resolution process, and the covariance matrix term may be inflated by a term representing small variance such as $1^{e-4}$ cycles-squared once the corresponding ambiguity has been fixed.

As previously suggested, the wide-lane filter 40 may comprise a zero-difference (ZD) wide-lane filter, a single-difference (SD) wide-lane filter, or a double-difference (DD) wide-lane filter, or all of the foregoing filters to determine ZD WL ambiguities, SD WL ambiguities, and/or DD WL ambiguities. The single-difference wide-lane ambiguity and variance/co-variance matrix for each constellation is derived from the wide-lane filter 40, such as a zero-differenced, wide-lane float ambiguity Kalman filter.

In one embodiment, a LAMBDA (Least-squares AMBiguity Decorrelation Adjustment) or a modified LAMBDA procedure is performed to resolve the WL ambiguities. For instance, the error minimization of the least squares equation for decorrelated ambiguities is carried out over a search region determined by variance and covariance matrix of the ambiguities; floating ambiguity estimates and associated variance/co-variance matrices can be used as inputs to the LAMBDA process, where the output is integer ambiguity estimates.

After passing the ambiguity resolution validation (e.g., consistent with the LAMBDA or modified LAMBDA process or an evaluation of the standard deviation of the resolved ambiguity candidates is less than a threshold fractional number of cycles over a minimum number of consecutive epochs), an integer constraint representing the single differencing of the float wide-lane ambiguities can be applied into the float ambiguity filter based on Equation (8). The fixed single differencing wide-lane ambiguities will be used for ambiguity fixing for the reference receiver 130 and the correction generation of the reference receiver 130 (e.g., virtual base station) to be used in the correction data 108 (e.g., distributed to any mobile receivers).

In one embodiment, the above WL filter 40 uses the WL equations to speed up convergence on the resolution of the WL ambiguities and to provide constraints or inputs for the narrow-lane filter 44 and narrow-lane ambiguity resolution, which can provide greater potential accuracy in position estimates because the WL carrier phase measurements are associated with more phase noise than the NL carrier phase measurements.

In one embodiment, the narrow-lane filter 44 can use the following equations described below. The refraction corrected (RC) measurement is formed with the advantage eliminating the first order of ionosphere delay error. The RC code measurements using Equation (1-2) are formed in Equation (15) as below, which is in meter-level accuracy but unbiased.

$$P_{RC}^j = \frac{f_1^2}{f_1^2 - f_2^2} P_1^j - \frac{f_2^2}{f_1^2 - f_2^2} P_2^j = \rho^j + \tau_r + b_{RC} + \tau^j + B_{RC}^j + T + \varepsilon_{P_{RC}}^j \quad (3)$$

where:
$b_{RC}$ is the receiver refraction-corrected code bias (one per receiver and constellation for all visible CDMA satellites, such as GPS satellites) which is a refraction-corrected (RC) combination of the L1 receiver code bias and the L2 receiver code bias;

$B_{RC}^j$ the satellite code bias which is a refraction-corrected (RC) combination of the L1 satellite code bias and the L2 satellite code bias;

$\varepsilon_{P_{RC}}^j$ is the refraction-corrected (RC) code measurement error for satellite j including white noise, multipath and remaining un-modeled errors; and the other variables or parameters have the same meaning as set forth earlier in this document.

In Equation 15, $b_{RC}$ can be lumped into the receiver clock state and can be estimated together as receiver clock nuisance parameters. For GLONASS satellites, an additional inter-channel code bias may be required to be estimated if the magnitude of the inter-channel code bias is significant. $B_{RC}^j$ can be lumped into the satellite correction $\tau^j$ when they are estimated together in satellite clock determination by the PPP network. Accordingly, for simplicity, the bias $b_{RC}$ and $B_{RC}^j$ in Equation (15) can be ignored and shown in Equation (16), $$P_{RC}^j = \frac{f_1^2}{f_1^2 - f_2^2} P_1^j - \frac{f_2^2}{f_1^2 - f_2^2} P_2^j = \rho^j + \tau_r + \tau^j + T + \varepsilon_{P_{RC}}^j \quad (16)$$

where:
$P_{RC}^j$ is the refraction-corrected phase code (or pseudo-range) for satellite j;

$P_1^j$ is the measured phase code or measured pseudo-range on the L1 frequency for satellite j;

$P_2^j$ is the measured phase code or measured pseudo-range on the L2 frequency for satellite j;

$\varepsilon_{P_{RC}}^j$ is the RC phase code measurement error for satellite j including white noise, multipath and remaining un-modeled errors; and the other variables are defined below Equation 17.

The refraction-corrected (RC) carrier phase measurement, $L_{RC}^j$ for satellite j, using Equations (3-4) is also formed in Equation (17) as below, which is in centimeter-level accurate but biased by an ambiguity term $\hat{N}_{NL}^j \lambda_{NL}$.

$$L_{RC}^j = \frac{f_1^2}{f_1^2 - f_2^2} L_1^j - \frac{f_2^2}{f_1^2 - f_2^2} L_2^j = \quad (4)$$
$$\rho^j + \tau_r + b_{NL} + \tau^j + B_{NL}^j + T + (N_{RC}^j + W^j + w)\lambda_{NL} + \varepsilon_{L_{RC}}^j$$

where:
$f_1$ is the L1 carrier frequency and $f_2$ is the L2 carrier frequency of the received satellite signals;

$L_1^j$ is the measured carrier phase for the L1 carrier frequency transmitted from satellite j;

$L_2^j$ is the measured carrier phase for the L2 carrier frequency transmitted from satellite j;

$\rho^j$ is the geometric distance between the satellite j phase center and the receiver phase center including satellite StarFire orbital correction, receiver tide displacement and earth rotation correction;

$\tau_r$ is the receiver r clock bias or error for a given GNSS system, where one receiver clock bias is estimated for each GNSS system such as GPS, GLONASS, Galileo or Beidou constellation;

$\tau^j$ is the satellite clock error;

$b_{NL}$ is the receiver narrow-lane phase bias (one per receiver and constellation for all visible satellites), $B_{NL}^j$ is the satellite j narrow lane phase bias (one per satellite for all receivers), which is a RC combination of the L1 satellite phase bias and the L2 satellite phase bias;

T is the tropospheric delay, and is divided into a dry component $T_{dry}$ and a wet component $T_{wet}$;

$W^j$ and w are phase windup errors for both satellite j and receiver, in cycles, respectively, which can be corrected with models;

$N_{RC}^j$ is the refraction-corrected (RC) carrier phase ambiguity term;

$$\lambda_{NL} = \frac{c}{f_1 + f_2}$$

is the narrow lane wavelength; and $\varepsilon_{L_{RC}}^j$ is the RC phase measurement error for satellite j including white noise, multipath and remaining unmodeled errors.

In Equation 17, $b_{NL}$ is a RC combination of the L1 receiver phase bias and the L2 receiver phase bias. If the $b_{NL}$ is lumped into the floating ambiguity state, the $b_{NL}$ in Equation (17) can be ignored. However, this model implies that an individual ambiguity does not have an integer characteristic. Similar to the case of WL, single-differenced narrow-lane ambiguities between satellite still hold the integer property.

Both satellite and receiver narrow lane biases are not constant over time. The satellite j narrow lane bias also represents the fractional part of the difference of code-based clock and integer phase-based clock. If the satellite code bias $B_{RC}^j$ is combined into the satellite clock correction, the $B_{NL}^j$ in Equation (17) will become the difference of $B_{NL}^j - B_{RC}^j$. $N_{RC}^j$ is the RC carrier phase ambiguity term in Equation (18), as below $$N_{RC}^j \lambda_{NL} = \frac{f_1^2}{f_1^2 - f_2^2} N_1^j \lambda_1 - \frac{f_2^2}{f_1^2 - f_2^2} N_2^j \lambda_2 \quad (18)$$

$$= \frac{N_{NL}^j}{2} \lambda_{WL} + \frac{N_{WL}^j}{2} \lambda_{NL}$$

$$= \lambda_{NL}\left(N_1^j + \frac{f_2}{f_1 - f_2} N_{WL}^j\right)$$

$$= \lambda_{NL}\left(N_2^j + \frac{f_1}{f_1 - f_2} N_{WL}^j\right)$$

The RC carrier phase ambiguity term $N_{RC}^j \lambda_{NL}$ can be further divided into two integer ambiguity terms. There are three equivalent combination forms, as shown in Equation (18):

(1) Combination of integer WL ambiguity $N_{WL}^j$ in Equation (10) and NL ambiguity $N_{NL}^j = N_1^j + N_2^j$;

(2) Combination of integer WL ambiguity $N_{WL}^j$ and integer L1 carrier phase ambiguity $N_1^j$; and (3) Combination of integer WL ambiguity $N_{WL}^j$ and integer L2 carrier phase ambiguity $N_2^j$ Both the WL/NL ambiguity integer $N_{WL}^j$ and $N_{NL}^j$ or L1/L2 carrier phase ambiguity integer $N_1^j$ $N_2^j$ can be resolved to improve position accuracy and reduce pull-in time. As long as the bias terms are removed from the refraction-corrected (RC) phase measurements, the high accuracy carrier phase measurement can be used to provide cm-level positioning. The narrow lane wavelength is much shorter than WL wavelength. In the case of GPS, the narrow lane wavelength is about 10.7 cm while WL wavelength is 86.4 cm. Therefore, in comparison with $N_{NL}^j$ the GPS WL ambiguity integer $N_{WL}^j$ can be resolved relatively easier. In order to recover the integer property of the RC carrier phase ambiguity term $N_{RC}^j$, the WL ambiguity integer $N_{WL}^j$ need be resolved at first.

In one embodiment, Equations (16-17) can be used for the narrow-lane filter 44. The zero differencing refraction-corrected code and phase raw observations are used for the narrow-lane filter 44 measurement update. Accordingly, in the backup data the stored narrow-lane ambiguities or stored refraction-corrected ambiguities can be used to derive the narrow-lane ambiguities. The state variables include receiver position and velocity, receiver clock offsets, residual troposphere delay and floating refraction-corrected ambiguities (which implicitly combine integer wide-lane and narrow-lane ambiguities in Equation (18) along with receiver phase bias). For GLONASS satellites, the additional inter-channel code bias per satellite may be required to be estimated if the magnitude of inter-channel code bias is significant.

The refraction-corrected phase measurements may compensate for first order ionospheric delay, or residual tropospheric delay that is not included in modeled tropospheric delay, T, or both. In one embodiment, the troposphere zenith delay and/or horizontal gradient coefficients can be estimated after an a priori troposphere model is applied. It should be noted that the receiver clock term for this method can absorb the receiver code bias. The satellite orbit, clock and satellite narrow lane bias corrections received from correction data 108 will be applied and remaining errors are reduced to sub-centimeter level.

In an illustrative configuration, the narrow-lane filter 44 can begin processing even before the satellite narrow-lane bias corrections are received or if they are invalid. The float narrow-lane ambiguity is adjusted by the satellite narrow-lane bias when it changes state to a valid state from an invalid state. Likewise, the satellite narrow-lane bias is adjusted or removed from the float narrow-lane ambiguity when the narrow-lane bias changes state to an invalid state from a valid state. In one embodiment, the float ambiguity is adjusted whenever +/−2 cycle jumps of satellite narrow-lane bias are detected. The adjustment of the satellite narrow-lane bias is limited to +/−2 cycles to reduce the bandwidth or resources for data processing.

In one embodiment, a Best Integer Equivariant (BIE) or a modified Best Integer Equivariant algorithm can be used to take advantage of the integer nature of the ambiguities to speed up the pull-in time and improve the overall positioning accuracy.

The observation model based on Equations (16-17) allows the estimation of the position coordinate, receiver clock offset, and floating ambiguities (each combining an integer narrow lane ambiguity with the receiver phase bias). The troposphere delay can be modeled or estimated along with other parameters. It should be noted that receiver clock term for this method can absorb the receiver code bias. The satellite orbit, clock and satellite narrow lane bias correction can be obtained from the correction data 108 are applied and the remaining errors are reduced to sub-centimeter level.

In a summary, the ambiguities can be resolved in two steps:

(1) The first step is wide-lane ambiguity resolution using the Equation (8). For example, details of wide-lane ambiguity resolution are discussed in conjunction with the wide-lane filter 40 in this document.

(2) The second step is the narrow-lane ambiguity resolution. For example, details of the narrow-lane ambiguity resolution are discussed in conjunction with the narrow-lane filter 44 in this document. The narrow-lane ambiguities are computed efficiently (e.g., on a constrained basis) by inserting the resolved integer wide-lane ambiguities into equation (18). This narrow lane ambiguity can be the integer ambiguity value associated with either the L1 or the L2 frequency, or the narrow lane combination of both the L1 and L2 frequencies. The effective narrow lane ambiguity wavelength is about 10.7 cm, which is independent of which of the narrow lane ambiguities is resolved. This narrow lane wavelength is easily computed for either the L1 or the L2 ambiguity using equation (18). If the narrow lane combination of both the L1 and L2 frequencies is used, the combined narrow-lane ambiguity wavelength is only one-half of the wavelength of an individual frequency narrow lane ambiguity. However, since the combined narrow-lane ambiguity must have the same odd-even integer characteristic as the wide lane ambiguity, the same effective wavelength (10.7 cm) results for the combined narrow-lane ambiguity and the individual narrow-lane ambiguity because of the odd-even constraint.

In one embodiment, the reference receiver 130 that resolves wide-lane ambiguities and narrow-lane ambiguities to arrive at a refraction-corrected narrow-lane ambiguity solution and associated precise position estimate can be used to form or generate correction data 108 for use by one or more rovers 22\ or mobile receivers in a network. At a reference receiver 130 after the narrow-lane filter 44 converges (for example, the position error is less than 10 cm) from reference receiver 130, raw measurement corrections can be generated based on the Equation (1-4). In an illustrative configuration, the correction data 108 can comprise one or more of the following: the converged position estimate of the reference receiver 130, residual troposphere delay, refraction-corrected ambiguities from Equation (17), fixed wide-lane ambiguities and covariance, along with raw measurement corrections. This correction data 108 can be broadcast via wireless communications devices and/or a wireless communications network 36 for other receivers nearby.

The reference station and the mobile station apply correction data 108 to the carrier phase measurements, the code phase measurements, or both. The correction data 108 contains corrections for one or more of the following: satellite orbit corrections, clock corrections, tide corrections (e.g., solid Earth tide, ocean tide and polar tide), both receiver and satellite antenna phase center variation and offset, and both receiver and satellite phase wind-up.

In one embodiment, the estimated parameters, such as receiver position, GNSS receiver clocks and troposphere delay are required to be corrected. The code biases for both satellite and receiver in Eq. (1-2), the phase biases in Eq. (3-4) for both satellite and receiver and ionosphere delay are uncorrected. The integer ambiguities and receiver phase bias for the carrier phase measurements remain in the phase corrections. The converged position, residual troposphere delay, refraction-corrected ambiguities in Equation (17), the fixed wide-lane ambiguities in Equation (8) and their variance information are combined with the raw measurement corrections as backup data for the mobile receiver 20, or as components in the correction data 108 to be distributed to mobile receivers 20.

If a receiver or method of this disclosure experiences a temporary loss or interruption of one or more received satellite signals (e.g., GNSS signals) for short time (e.g., for a few minutes) and subsequently regains one or more of the received satellite signal after the brief loss or interruption, the receiver or method can employ an innovative Rapid Recovery technique of recovering the converged position solution (e.g., PPP solution or position estimate) rapidly to approximately the same level of accuracy before the signal blockage by estimating the differences of navigation states, such as position, carrier phase ambiguities, or the like. In accordance with one embodiment, the Rapid Recovery technique has three steps or components comprising the following: (1) virtual base correction generation, (2) RTK ambiguity fix and (3) Rapid recovery process.

Virtual Base Correction Generation

The backup data can include but is not limited to refraction corrected (RC), narrow-lane (NL) resolved ambiguities, in accordance with Equation 17. After the narrow-lane (NL) filter converges (e.g., the position error is less than 10 centimeters), the mobile receiver generates backup data (e.g., measurement corrections for the first measurement time) or updates the backup data (e.g., at regular intervals with retention of only the last or most current backup data) based on the Equations (1-4). The mobile receiver 20 stores the backup data, associated with a first measurement time (e.g., $t_1$) in a data storage device 62 for potential use to recover from any signal blockage events or interruptions of one or more received satellite signals from satellite transmitters 100 at the mobile receiver 20. The backup data can also be referred to as virtual base station correction data. The backup data may include one or more of the following: the converged position, residual troposphere delay, refraction-corrected ambiguities from Equation (17), ionospheric delay rate estimate, fixed wide-lane ambiguities and covariance, and raw measurement corrections.

In one embodiment, correction data 108 (as opposed to backup data) comprises satellite orbit and clock corrections that can be applied to the raw phase measurements at the mobile receiver. In another embodiment, the correction data 108 comprises one or more of the following: satellite orbit and clock corrections, tide corrections, receiver antenna phase center variation, receiver antenna phase center offset, satellite phase center variation, satellite antenna phase center offset, receiver phase wind-up, and satellite phase wind-up. For example, tide correction data 108 can comprise any of the following items: solid Earth tide, ocean tide and polar tide. The correction data 108 is received by the correction wireless device 26, which is co-located with the mobile receiver 20, and the mobile receiver 20 can apply to the correction data 108 to the raw phase measurements of one or more satellite signals, or both raw phase measurements and raw code phase measurements. The mobile receiver 20 applies the correction data 108 in conjunction with the saved backup data to rapidly recover the precise position of the mobile receiver, such as a precise position based on a fixed or resolved ambiguity in the carrier phase of the received satellite signals.

Certain parameters cannot be measured directly as observables at the mobile receiver 20 or any reference receiver 130. The mobile receiver 20 estimates estimated parameters, such as receiver position, (GNSS) receiver clock, and troposphere delay from the observables, or the observables in combination with models. After considering the correction data 108 and the estimated parameters, the mobile receiver 20 has certain biases. For example, the code biases for both satellite and receiver in Equations (1-2) are not corrected, the phase biases in Equations (3-4) for both satellite and receiver and ionosphere delay are not corrected. The correction data 108 does not contain integer ambiguities and receiver phase bias for the carrier phase measurements.

The integer ambiguities and receiver phase bias remain in the correction data 108 that is applied at the mobile receiver 20.

Ionospheric Estimation/Modeling

In one embodiment, at the mobile receiver 20 in the relative positioning module 18, the navigation positioning estimator 50, or the atmospheric bias estimator 42 estimates the atmospheric delay or bias between time $t_1$ and $t_2$, where $t_1$ represent the time prior to signal loss or interruption and $t_2$ represent the time after the signal loss or interruption. The atmospheric dependent errors such as ionosphere error (i.e. I) should be handled independently at each time $t_1$ and $t_2$. In one embodiment, the first strategy generally used to mitigate this portion of errors is a combination of modeling and estimation. The ionosphere delay error increases over time quickly (e.g., roughly speaking 10 centimeters per minute). When dual frequency carrier phase measurements from Equations (3-4) are available from a receiver (e.g., mobile receiver), the difference of geometry free phase measurements between satellites i and j over $t_1$ and $t_2$ can be expressed as Equation (19) at follows:

$$\nabla \Phi_1^{ij}\lambda_1(t_2) - \nabla \Phi_2^{ij}\lambda_2(t_2) - \nabla \Phi_1^{ij}\lambda_1(t_1) + \nabla \Phi_2^{ij}\lambda_2(t_1) = \\ \frac{f_1^2 - f_2^2}{f_2^2}\nabla \Delta I_{t_1,t_2}^{ij} + \nabla B_{L_1}^{ij}(t_2) - \nabla B_{L_1}^{ij}(t_1) - \nabla B_{L_2}^{ij}(t_2) + \\ \nabla B_{L_2}^{ij}(t_1) + \nabla W_{t_2}^{ij}(\lambda_1 - \lambda_2) - \nabla W_{t_1}^{ij}(\lambda_1 - \lambda_2)$$
(19)

Where $\nabla$ is difference operator between satellites i and j. $\nabla \Delta I_{t_1,t_2}^{ij}$ is ionosphere change (e.g., double-difference ionosphere estimate) between satellites i and j over $t_1$ (before shading or signal interruption) and $t_2$ (after shading or signal interruption). Equation 19 has a first difference in phase wind-up $W_{t_1}^{ij}$ between satellites i and j over $t_1$ (before shading or signal interruption) and $t_2$ (after shading or signal interruption), and second difference in phase wind-up $W_{t_2}^{ij}$ between satellites i and j over $t_1$ (before shading or signal interruption) and $t_2$ (after shading or signal interruption).

At the mobile receiver 20, the receiver phase wind-up and receiver phase bias can be cancelled between the satellites (100). The satellite phase bias and phase wind-up change very slowly over time. One of major factors causing the phase wind-up change is attributable to satellite yaw rotation, which is less than the maximum yaw rate 0.2 degree per second. For simplicity, the satellite phase bias and phase windup changes can thus be ignored. The above-mentioned equation (19) can then be simplified as Equation (20)

$$\nabla \Phi_1^{ij}\lambda_1(t_2) - \nabla \Phi_2^{ij}\lambda_2(t_2) - \nabla \Phi_1^{ij}\lambda_1(t_1) + \nabla \Phi_2^{ij}\lambda_2(t_1) = \frac{f_1^2 - f_2^2}{f_2^2}\nabla \Delta I_{t_1,t_2}^{ij}$$
(20)

The ionosphere change $\nabla \Delta I_{t_1,t_2}^{ij}$ can be modeled as a first-order Gauss-Markov process as Equation (21) as follows:

$$\nabla I^{ij}(t_2) = \phi_{t_1,t_2} \cdot \nabla I^{ij}(t_1) + Q_{t_1,t_2}, \text{ where } \phi_{t,t-1} \cong e^{-\tau(t_2-t_1)}, \\ Q_{t_1,t_2} = q_I^2(t_2-t_1)$$
(21)

where $\tau$, $\sigma$ are correlation time and dynamics of the ionosphere rate which are design factors characterizing the model, and $Q_{t_1,t_2}$ is a time-varying, first-order Gauss-Markov, function based on the ionosphere parameter $q_I^2$. In the navigation positioning estimator 50 or the atmospheric bias estimator 42, the measurements from Equation (20) can be used for measurement update and Equation (21) can be used for time update, respectively, of the precise positioning module 16, the atmospheric bias estimator 42, or a predictive filter (e.g., Kalman filter) used to estimate this ionospheric delay change. Note that only incremental or relative ionospheric values (e.g., $\Delta I = I(t_2) - I(t_1)$) are interesting, but not the absolute ionospheric error itself (e.g., $I(t_2)$ or $I(t_1)$). It should be emphasized that in order to model the ionosphere rate properly, the differencing operation between satellites is required in order to eliminate the receiver phase bias and receiver phase wind-up changes over time.

In the mobile receiver 20, navigation positioning estimator 50 or precise positioning module 16 determines or estimates the backup data for the first measurement time ($t_1$). For example, for the first measurement time, $t_1$ (e.g., prior to signal loss or interruption), the mobile receiver 20 determines and the backup/recovery module 46 stores, retrieves or manages the backup data, such as converged position of the mobile receiver 20 residual troposphere delay, refraction-corrected ambiguities in the equation (17), the ionosphere rate in Equation (21), the fixed wide-lane ambiguities in the Equation (8) and their variance information are combined with the raw measurement corrections. The backup data for the first measurement time (e.g., $t_1$) is stored in the data storage device 62 of the mobile receiver 20, which can be modeled as a virtual base station or virtual reference receiver for time $t_1$.

In addition to the signal blockage, the occurrence of a power outage can also cause the precise positioning module 16 (e.g., a precise point position (PPP) navigation module or estimator) reset and corresponding long convergence time. For example, a power outage of the mobile receiver can occur because of power-connectivity issue (e.g., broken wire in a wiring harness or oxidized connector), battery discharge, circuit breaker, blown fuse, main power cut-off from a vehicle (e.g., agricultural work vehicle) to the mobile receiver. Accordingly, in certain embodiments, the data storage device 62 may comprise non-volatile random memory or flash memory such that the backup data (e.g., virtual base correction) for Rapid Recovery (RR) before shading can be read, retrieved or recovered after the mobile receiver is power cycled within a short gap, such as approximately three (3) to approximately five (5) minutes. As a power loss can occur anytime, the virtual base corrections are written to data storage device (e.g., NVRAM) in a regular time interval based on user settings or factory default settings, such as approximately every 30 seconds. Further, in on embodiment, the previously recorded backup data for the first measurement time $t_1$ is refreshed or overwritten with new or current backup data for the measurement time for each regular time interval, or for a separate overwrite time interval that exceeds the regulator time interval.

RTK Ambiguity Resolution

In one embodiment, the relative positioning module 18 comprises a real-time kinematic (RTK) filter or relative position estimator. In general, the relative positioning module 18 comprises a predictive filter, such as Kalman filter or a modified Kalman filter. RTK algorithm is a reliable method for determining the relative position and ambiguity difference between two receivers in carrier-phase positioning in real-time (e.g., for navigation applications). If the reception of the received satellite signals is interrupted at the mobile receiver, because of a temporary power loss of input power to the mobile receiver or obstruction of the received satellite signal from shading (e.g., trees or vegetation), there will be a measurement gap (e.g., GNSS measurement gap) in the raw phase measurements and raw code phase measurements at the mobile receiver. Further, the ambiguities before shading at the first measurement time and the ambiguities after shading at the second measurement time may change. Therefore, for precise positioning the mobile receiver 20, the precise positioning module 16 or the relative positioning module 18 determines new ambiguities and the cycle slip detector 59 detects cycle slips. However, some error sources such as the satellite-dependent code and phase biases before shading do not change significantly over a short time from when the satellite orbit and clock corrections are applied; the mobile receiver mitigates the effects of changes over time (e.g., between the first measurement time and the second measurement time) by applying a time differencing operator between epochs (e.g., between the first measurement time and the second measurement time). In order to handle this situation effectively, the mobile receiver 20 or the relative positioning module 18 uses an RTK technique or filter. The purpose of the RTK ambiguity resolution is to compute the relative position change from before and after shading $\Delta X_{RTK}$, as well as the double-difference (DD) ambiguities for wide-lane (WL) and refraction-corrected (RC), $\nabla \Delta_{WL}^{ij}$ (RTK) and $\nabla \Delta_{RC}^{ij}$ (RTK). Here, the RTK is not used to determine the relative position and relative position and ambiguity difference between two receivers in carrier-phase positioning. Instead, the backup data (e.g., previous measurement corrections) from the first measurement time are is considered as a virtual base station. Actually, the double differencing approach between epochs ($t_1$ and $t_2$) and between satellites, similar to RTK, are used.

The RTK algorithm or RTK-like algorithm uses the following double-difference equations for code phase and carrier phase to determine the relative position vector (e.g., baseline vector) between the reference receiver 130

$$\nabla \Delta P_1^{ij} = \nabla \Delta \rho^{ij} + \nabla \Delta I^{ij} + \nabla \Delta \varepsilon_{P_1}^{ij} \qquad (22)$$

$$\nabla \Delta P_2^1 = \nabla \Delta \rho^j + \frac{f_1^2}{f_2^2} \nabla \Delta I^{ij} + \nabla \Delta \varepsilon_{P_2}^{j} \qquad (23)$$

$$\nabla \Delta L_1^{ij} = \nabla \Delta \rho^{ij} - \nabla \Delta I^{ij} + \nabla N_1^i \lambda_1^i - \Delta N_1^j \lambda_1^j + \nabla \Delta \varepsilon_{L_1}^{ij} \qquad (24)$$

$$\nabla \Delta L_2^{ij} = \nabla \Delta \rho^{ij} - \frac{f_1^2}{f_2^2} \nabla \Delta I^{ij} + \Delta N_2^i \lambda_2^i - \Delta N_2^j \lambda_2^j + \nabla \Delta \varepsilon_{L_2}^{ij} \qquad (25)$$

$\nabla \Delta L_1^{ij}$ is the double-difference L1 carrier phase measurements with respect to satellite i and j and the mobile receiver at the measurement times $t_1$ and $t_2$, where $t_1$ is the first measurement time and $t_2$ is the second measurement time;

$\nabla \Delta \rho^{ij}$ is the double-difference geometric distance between the satellite j phase center and the mobile receiver phase center and between satellite i phase center and the receiver phase center, including satellite orbital correction, receiver tide displacement and earth rotation correction;

$\nabla \Delta I^{ij}$ is the double-difference ionosphere error for a given satellite j and satellite i;

$\nabla N_1^i \lambda_1^i$ is the single-differenced integer ambiguity for satellite i multiplied by the wavelength for the L1 carrier from satellite i;

$\Delta N_1^j \lambda_1^j$ is the single-differenced integer ambiguity for satellite j multiplied by the wavelength for the L1 carrier from satellite j;

$\nabla \Delta \varepsilon_{L_1}^{ij}$ is the double-difference phase measurement error for satellite j and satellite i including white noise, multipath and remaining un-modeled errors with respect to the L1 frequency;

$\nabla \Delta L_2^{ij}$ is the double-difference L2 carrier phase measurements with respect to satellite i and j, and the mobile receiver at the measurement times $t_1$ and $t_2$ where $t_1$ is the first measurement time and $t_2$ is the second measurement time;

$\Delta N_2^i \lambda_2^j$ is the single-differenced integer ambiguity for satellite i multiplied by the wavelength for the L2 carrier from satellite i;

$\Delta N_2^j \lambda_2^j$ is the single-differenced integer ambiguity for satellite j multiplied by the wavelength for the L2 carrier from satellite j;

$\nabla \Delta \varepsilon_{L_2}^{ij}$ is the double-difference phase measurement error for satellite j and satellite i including white noise, multipath and remaining un-modeled errors with respect to the L2 frequency; and $f_1$ is the L1 carrier frequency and $f_2$ is the L2 carrier frequency of the received satellite signals.

In Equations (22-25), the receiver/satellite dependent errors, such as code phase bias (e.g., receiver code phase bias and satellite code phase bias), carrier phase bias (e.g., receiver phase bias and satellite phase bias) and clock bias (e.g., receiver clock bias and satellite clock bias), that are common between satellites and the mobile receiver at measurement times $t_1$ and $t_2$ (e.g., measurement times or epochs) can be cancelled out by the double differencing operation between satellites and receiver at measurement times. $t_1$ and $t_2$ where $t_1$ is the first measurement time and $t_2$ is the second measurement time.

Under certain conditions, the ionosphere error can be significant; mobile receiver 20 can compensate for the ionosphere error based on the time difference and the ionosphere rate estimated in the Equation (21). The remaining ionosphere error is also estimated per satellite in the RTK engine. The troposphere error is corrected based on the elevation mapping function using the troposphere bias estimation before the shading events or power cycle. In one embodiment, the mobile receiver 20 can ignore the remaining satellite dependent errors including orbit, clock, code bias and phase biases after the time differencing operator is conducted and orbit and clock corrections from the correction data 108 are applied at both epochs.

Although two GNSS receivers (e.g., reference receiver 130 and rover 20) and two satellites are usually required for the formation of a double-difference measurements, here one GNSS receiver (e.g., mobile receiver 20 or rover) takes measurements at two different measurement times for two different satellites to form double-difference measurements. In one embodiment in accordance with the RTK algorithm, a minimum of four double-difference equations and five satellites are required to solve for the relative position vector and the associated integer ambiguity for a three dimensional position estimates (e.g., in Cartesian coordinates, x, y, z).

The correction data 108, which includes orbit and clock corrections, are applied for the mobile receiver between the two measurement times or epochs (e.g., between the first measurement time and the second measurement time). It should be mentioned that the different GLONASS satellites have different frequency and wavelength. Accordingly, for GLONASS satellites, the receiver clock error after the double-differencing phase measurements can be cancelled, but the resulting double differencing ambiguities are not integers any more. The float ambiguity bias for each reference satellite (e.g., GLONASS satellite) is required to be estimated.

The relative positioning module 18 or an RTK algorithm can be used to estimate the difference of integer ambiguity or cycle slips between $t_1$ and $t_2$, remaining ionosphere delay bias per satellite, relative position change (of the mobile receiver 20) $\Delta X_{RTK}=X(t_2)-X(t_1)$ at $t_2$ from the position at time $t_1$. $X(t_1)$ is a known position, or rather a converged position, with precise (e.g., PPP) centimeter level accuracy if the precise positioning module (e.g., PPP module) or the predictive filter for Equation (17) is already converged.

In one embodiment, the standard LAMBDA method, the least squares method, or another ambiguity resolution technique can be applied to resolve the DD ambiguities. If the ambiguity resolution succeeds, the relative position accuracy of $\Delta X_{RTK}$ can be determined to centimeter level as well. Therefore, precise position $X(t_2)$ of the mobile receiver or rover at the second measurement time can be derived at centimeter level accuracy. If the DD L1 ambiguities and DD L2 ambiguities (e.g., or ambiguity changes) can be fixed correctly in Equations (24-25), the double difference of wide lane integer ambiguity and refraction corrected ambiguity between satellite i and j and between measurement times $t_1$ and $t_2$ can be derived using Equations (26-27):

$$\nabla \Delta N_{WL}^{ij}(RTK) = \nabla \Delta N_1^{ij} - \nabla \Delta N_2^{ij} \tag{26}$$

$$\nabla \Delta N_{RC}^{ij}(RTK) = \frac{f_1^2}{f_1^2-f_2^2}\nabla \Delta N_1^{ij} - \frac{f_2^2}{f_1^2-f_2^2}\nabla \Delta N_2^{ij} \tag{27}$$

where:
$\nabla \Delta N_{WL}^{ij}(RTK)$ is the RTK double-difference wide-lane ambiguity for satellites i and j with respect to the mobile receiver at measurement times $t_1$ and $t_2$ where $t_1$ is the first measurement time and $t_2$ is the second measurement time;
$\nabla \Delta N_1^{ij}$ is the double-difference L1 wide-lane ambiguity for satellites i and j with respect to the mobile receiver measurement times $t_1$ and $t_2$ where $t_1$ is the first measurement time and $t_2$ is the second measurement time;
$\nabla \Delta N_2^{ij}$ is the double-difference L2 wide-lane ambiguity for satellites i and j with respect to the mobile receiver a measurement times $t_1$ and $t_2$ where $t_1$ is the first measurement time and $t_2$ is the second measurement time;
$f_1$ is the frequency of the L1 carrier phase signal and $f_2$ is the frequency of the L2 carrier phase signal; and
$\nabla \Delta N_{RC}^{ij}(RTK)$ is the RTK refraction-corrected double-difference float ambiguity (e.g., wide-lane or narrow-lane) for satellites i and j with respect to the mobile receiver at measurement times $t_1$ and $t_2$.

Recovery Process

After RTK ambiguity resolution is successfully completed, the following constraint process called rapid recovery will start. In one embodiment, the rapid recovery process comprises the following steps: (1) single difference wide-lane ambiguity recovery, (2) current mobile receiver position or rover position recovery (e.g. at the second measurement time, $t_2$), (3) troposphere bias constraints, (4) single difference refraction-corrected ambiguity constraints and (5) constraint outlier detection and adaptation. The high-level purpose of the rapid recovery process is to allow for seamless precise positioning module (e.g., PPP estimator) recovery based on the RTK results from Equations 24-27.

(1) Single-Difference Wide-Lane Ambiguity Recovery
The resolution of single-differenced ambiguity between satellites is preferred over the zero-difference ambiguity because the zero-difference ambiguity contains both integer ambiguity value and a common receiver phase bias or error, which can change rapidly.

The SD wide-lane ambiguity $\nabla N_{WL}^{ij}(t_1)$ can be fixed into integer value in Wide-lane filter using the Eq. (8) before the shading event or at the first measurement time, $t_1$. The fixed DD wide-lane ambiguity $\nabla \Delta N_{WL}^{ij}(RTK)$ in Eq. (26) and $\nabla N_{WL}^{ij}(t_1)$ can be used to recover current wide-lane SD integer ambiguity. The SD wide-lane integer ambiguity can be computed in Eq. (28) below. The integer constraint $\nabla N_{WL}^{ij}(t_2)$ associated with the second measurement time (e.g., $t_2$) or $\nabla N_{WL}^{ij}(PPP)$, associated with correction data 108 (e.g., precise point positioning correction data 108, which remains valid from the second measurement time until a cycle slip) can then be applied into current wide-lane filter in Equation 8.

$$\nabla N_{WL}^{ij}(PPP)=\nabla \Delta N_{WL}^{ij}(RTK)+\nabla N_{WL}^{ij}(t_1)$$

or $$\nabla N_{WL}^{ij}(t_2)=\nabla \Delta N_{WL}^{ij}(RTK)+\nabla N_{WL}^{ij}(t_1) \tag{28}$$

(2) Current Mobile Receiver Position
The current precise (e.g., PPP) position $X(t_2)$ at the second measurement time can be derived in Equation (29) from the relative position change $\Delta X_{RTK}=X(t_2)-X(t_1)$ in the RTK solution, and RTK virtual base position $X(t_1)$ at time $t_1$ from previously converged precise (e.g., PPP) solution.

$$X(t_2)=\Delta X_{RTK}+X(t_1) \tag{29}$$

where:
$X(t_2)$ is the position (second position or current position) of the mobile receiver at the second measurement time, $t_2$;
$\Delta X_{RTK}$ is a relative change in position of the mobile receiver that is observed by the RTK filter between the first measurement time, $t_1$, and the second measurement time, $t_2$; and
$X(t_1)$ is the estimated position (first position) of the mobile receiver (also referred to as virtual base) at the first measurement time, The covariance matrix $Q_{XYZ}(t_2)$ for current position can be derived from the variance of virtual base position $Q_{XYZ}(t_1)$ and relative position change $Q_{\Delta XYZ(RTK)}$ in RTK from time $t_1$ to $t_2$ respectively if they are assumed to be un-correlated as shown in Equation (30)

$$Q_{XYZ}(t_2)=Q_{\Delta XYZ(RTK)}+Q_{XYZ}(t_1) \tag{30}$$

where:
$Q_{XYZ}(t_2)$ is the covariance matrix for the estimated position of the mobile receiver at the second measurement time;
$Q_{\Delta XYZ(RTK)}$ is the change in the covariance matrix associated with the relative change in position $\Delta X_{RTK}$; and
$Q_{XYZ}(t_1)$ is the covariance matrix for the estimated position of the mobile receiver at the first measurement time.

The precise position $X_{PPP}(t_2)$ (e.g., precise point position) and corresponding covariance matrix $Q_{XYZ}(t_2)$ can be considered as virtual measurements or constraints to be applied to the current narrow-lane filter in the navigation positioning estimator 50 or in the relative positioning module 18.

(3) Tropospheric Delay Error
In certain embodiments, the remaining troposphere delay error (e.g., additional residual tropospheric delay), after a prior modeling of tropospheric delay, T, pursuant to the equations referenced in this document, can be estimated as it changes slowly over time and with traveled distance. For example, the estimated troposphere remains generally unchanged over a short time period (e.g., a few minutes between observed measurement times $t_1$ and $t_2$) in accordance with Equation (31). However, over a greater time period (e.g., greater than a few minutes) the variance of estimated tropospheric delay $$(\text{e.q., } Q_{T_{t_2}})$$

at subsequent measurement time (e.g., $t_2$) is required to be inflated by both spatial $q_{Trop}^{Spatial}$ (such as 0.1 ppm) and temporal correlation factors $q_{Trop}^{Temporal}$ (such as 1 centimeter per hour) in Equation (32). The Equations (31-32) below can be considered as a virtual measurement to constrain the troposphere delay estimation in the precise positioning estimator 16 (e.g., PPP estimator).

$$T(t_2) \approx T(t_1) \quad (31)$$

where:
T($t_2$) is the estimated tropospheric delay for the mobile receiver at the second measurement time, $t_2$; and
T($t_1$) is the estimated tropospheric delay for the mobile receiver (e.g., by the atmospheric bias estimator 42) at the first measurement time, $t_1$.

$$Q_{T_{t_2}} = Q_{T_{t_1}} + \Delta t * q_{Trop}^{Temporal} + |\Delta X_{RTK}| * q_{Trop}^{Spatial} \quad (32)$$

where:

$$Q_{T_{t_2}}$$

is the variance of estimated tropospheric delay at the second measurement time, t2;
$q_{Trop}^{Spatial}$ is a spatial correlation factor for inflating the covariance over spatial displacement of the mobile receiver;
$q_{Trop}^{Temporal}$ is a temporal correlation factor for inflating the covariance over time;
$|\Delta X_{RTK}|$ is traveled distance of the mobile receiver from the first measurement time, $t_1$, to the second measurement time, $t_2$, and
$\Delta t = t_2 - t_1$ or the time difference between the first measurement time and the second measurement time.

(4) Single Difference Refraction-Corrected Ambiguity Constraints

In one embodiment, the SD refraction-corrected ambiguity and variance at time $t_2$ can be derived as shown below in Equations (33-34) based on the previous (before signal blockage) converged RC ambiguity $\nabla N_{RC}^{ij}(t_1)$ at $t_1$ and DD ambiguity $\nabla \Delta N_{RC}^{ij}$(RTK). The $\nabla N_{RC}^{ij}(t_1)$ and variance $Q_{\nabla N_{RC}^{ij}}(t_1)$ can be computed as part of the virtual base correction from the narrow-lane filter as shown in Equations (16-17).

$$\nabla N_{RC}^{ij}(t_2) = \nabla \Delta N_{RC}^{ij}(RTK) + \nabla N_{RC}^{ij}(t_1) \quad (33)$$

$$Q_{\nabla N_{RC}^{ij}}(t_2) = Q_{\nabla \Delta N_{RC}^{ij}(RTK)} + Q_{\nabla N_{RC}^{ij}}(t_1) \quad (34)$$

(5) Constraint Outlier Detection and Adaptation

The Variance of $\nabla \Delta N_{RC}^{ij}$ (RTK) is zero if both L1 and L2 ambiguity are fixed into integer values. Otherwise, the variance of float $\nabla \Delta N_{RC}^{ij}$ (RTK) ambiguity can derived from RTK ambiguity state variance. It should be mentioned that the constraint of float ambiguity from RTK can be applied as well.

After the constraints of single-difference (SD) wide-lane (WL) ambiguities are determined, current position, troposphere and single-difference ambiguities are estimated by the wide lane 40 and narrow-lane filter 44; the post-fit residuals of these constraints (e.g., SD WL ambiguities, other SD ambiguities, or DD ambiguities, respectively) can be computed by the navigation positioning estimator 50. The ratio of post-fit residual, or its standard deviation, divided by the square root of the variance (e.g., standard deviation) of the constraint can be computed. If that ratio exceeds a large threshold such as 3, the constraint (e.g., SD WL ambiguities, other SD ambiguities, or DD ambiguities, respectively) should be considered problematic. The ratio exceeding the threshold could be caused by incorrect RTK ambiguity resolution output of the RTK filter 48 or of the navigation positioning estimator 50, for example. The remedy for this issue of ratio exceeding the threshold or erroneous ambiguity resolution is to remove the corresponding problematic constraints one-by-one. An alternative approach is to de-weight those problematic constraint(s) by increasing their variance, using the ratio as a scaling factor, for example. Typically, the adaptation is done in an iterative way.

In one configuration, the recovered data includes one or more of the following: (1) single difference wide-lane ambiguities, (2) current mobile receiver position (e.g. at the second measurement time, $t_2$), (3) troposphere bias constraints, (4) single difference refraction-corrected ambiguities and (5) variance in SD WL ambiguities, mobile receiver position, tropospheric bias, or SD RC ambiguities. The recovered data is based recovery data such as one or more of the following: RTK DD wide-lane integer ambiguity, $\nabla \Delta N_{WL}^{ij}$ (RTK); RTK fixed refraction-corrected (RC) float ambiguity, $\nabla \Delta N_{RC}^{ij}$ (RTK); and the relative position $\Delta X$ (e.g., relative position vector between the mobile receiver at the first measurement time and the second measurement time); and the variance/co-variance of the relative position $\Delta X$. The recovery data can be used as additional constraints or inputs to speed up current filter convergence (e.g., wide-lane filter convergence, narrow-lane filter convergence, or both) process at rover in the precise positioning module.

Figure 3:
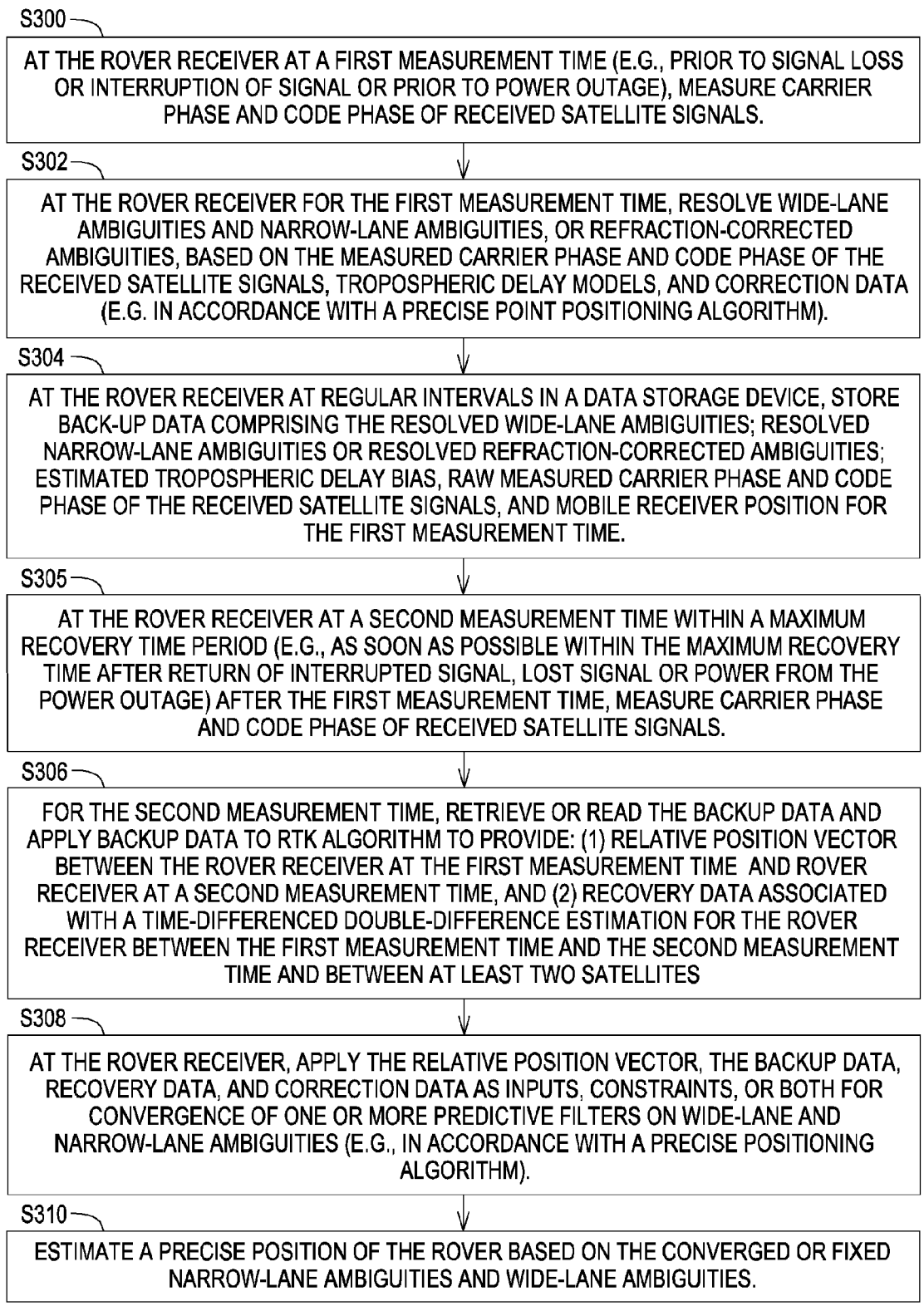
FIG. 3 illustrates one embodiment of method and satellite receiver for operating a satellite receiver for rapid determination of precise position by backup data.

FIG. 3 illustrates one embodiment of method and satellite receiver for rapid recovery of precise position by backup data upon temporary loss or interruption of one or more received satellite signals. The method of FIG. 3 begins in step S300. In step S300, the mobile receiver 20 (e.g., rover) or the measurement module 56 measures carrier phase and code phase of received satellite signals at a first measurement time (e.g., first epoch). The first measurement time is prior to signal loss, corruption, degradation, disruption, interference with, or interruption of any of the following: (a) received satellite signals from one or more satellite transmitters 100, (b) the correction signal from a correction data source (24 or 124), or (c) prior to power outage of electrical power (e.g., direct current voltage from a vehicle) supplied to the mobile receiver 20. For example, if the correction signal that carries the correction data 108 is from a communications satellite 135, the correction wireless device 26 (e.g., L-band satellite receiver) can experience signal loss (e.g., fading or shading) simultaneously with the mobile receiver 20 that receives the L1 and L2 carrier signals, depending upon the orientation and elevation of the respective communications satellite 135 and applicable GNSS satellite transmitters 100. In one embodiment, the carrier phase measurement module 58 measures or attempts to measure carrier phase of the received satellite signals within view or reception range over a series of measurement times (e.g., successive epochs including the first epoch or first measurement time). Further, the code phase measurement module 60 may measure or attempt to measure code phase or pseudo range of the received satellite signals within view or reception range of the series of measurement times (e.g., successive epochs including the first epoch).

In step S302 at the mobile receiver 20 for the first measurement time, the precise positioning module 16 or navigation positioning estimator 50 resolves: (1) wide-lane ambiguities and (2) narrow-lane ambiguities or refraction-corrected ambiguities based on the measured carrier phase and code phase of the received satellite signals, tropospheric delay models, and correction data 108 (e.g. in accordance with a precise point positioning algorithm). For example, the mobile receiver 20 can estimate wide-lane (WL) ambiguities (e.g., single-difference (SD) WL ambiguities); narrow-lane ambiguities (e.g., single difference (SD) NL ambiguities) or refraction-corrected (RC) ambiguities; a reference position and residual tropospheric bias at the mobile receiver 20 based on the correction data 108 (e.g., precise point position (PPP) correction data). In one embodiment, the precise point position (PPP) correction data comprises precise clock and orbit data for respective satellites, such as clock data that has less than a certain error measured in time or range error and orbit data that meets certain standard deviation metrics to support reliable position estimates with sub-decimeter level accuracy on a global basis. In one example, consistent with the resolved ambiguities, the precise positioning module 16 or navigation positioning estimator 50 estimates the reference position (e.g., three dimensional coordinates), which comprises a precise point positioning reference position of the mobile receiver 20 that is stationary or mobile.

In step S304 at the mobile receiver 20 at regular intervals, the mobile receiver 20 stores backup data in a data storage device 62 (e.g., nonvolatile random access memory), where the backup data comprises the resolved wide-lane ambiguities; resolved narrow-lane ambiguities or resolved refraction-corrected ambiguities; estimated tropospheric delay bias, raw measured carrier phase and code phase of the received satellite signals, and reference receiver 130 position. For example, the backup data from step S302 is stored in the data storage device 62 at a regular interval (e.g., periodic basis or refresh rate, such as approximately once every twenty seconds to every five minutes).

In step S305 at a second measurement time (e.g., second epoch after the first epoch) within a maximum recovery time period after the first measurement time or after a detection time (e.g., first detection time) of signal loss, interruption, disruption, or corruption that immediately follows the first measurement time; the mobile receiver 20 measures carrier phase and code phase of the received satellite signals. In one example, the maximum recovery time period is as soon as possible within the maximum recovery time after return of an interrupted signal, lost signal, or power from the power outage.

In step S306, for the second measurement time, the mobile receiver 20 retrieves or reads the backup data and applies the backup data to the real-time kinematic (RTK) algorithm or the RTK filter 48 of the relative positioning module 18 to provide: (1) relative position vector between the mobile receiver 20 at the first measurement time and the mobile receiver 20 at the second measurement time, and (2) recovery data associated with the a time-differenced, satellite-differenced, double-difference measurements, for the mobile receiver, between the first measurement time and the second measurement time (e.g., time-differenced) and between at least two satellites (e.g., satellite-differenced). The recovery data is distinct from the backup data, where the relative positioning module 18 derives from the recovery data from the backup data and the RTK filter 48. As indicated above, the recovery data includes one or more of the following: RTK double-difference (DD) wide-lane integer ambiguity, $\nabla\Delta N_{WL}^{ij}$ (RTK); RTK fixed refraction-corrected (RC) double-difference (DD) float ambiguity, $\nabla\Delta N_{RC}^{ij}$ (RTK); and the relative position $\Delta X$ (e.g., relative position vector of the mobile receiver between the first measurement time and the second measurement time); and the variance/co-variance of the relative position $\Delta X$.

Step S306 may be carried out by various techniques, which may be applied separately or cumulatively. Under a first technique, the relative positioning module 18 uses double-difference of phase measurements at the mobile receiver 20 between the first measurement time and the second measurement time and two satellites to resolve double-difference RTK ambiguities.

Under a second technique, relative positioning module 18 or the real-time kinematic filter 48 determines a relative position or the relative position vector for a mobile receiver 20 between the first measurement time and the second measurement time based on a set of real-time kinematic (RTK) algorithms to resolve the L1/L2 double-differenced (DD) fixed integer values ($N_1$, $N_2$) for the mobile receiver 20 on the L1 frequency and reference satellite per Global Navigation Satellite System (GNSS) system and between the mobile receiver 20 on the L2 frequency and the same reference satellite per GNSS system.

Under a third technique, the data storage device 62 of the rover 20 stores or retrieves backup data provided from the data storage device 62 to the navigation positioning estimator 50, where the backup data comprises a set of one or more of the following: resolved wide-lane ambiguities, resolved narrow-lane ambiguities, estimated tropospheric delay bias, raw measured carrier phase of the received satellite signals, and mobile receiver position (e.g., fully or substantially converged precise point position (PPP) of the mobile receiver 20).

Under a fourth example, S306, the mobile receiver 20 can receive a data message of backup data from a data storage device 62, where the backup data comprises the estimated (e.g., pulled-in or post-convergence) wide-lane (WL) and narrow-lane (NL) ambiguities from one or more satellite carrier signals, estimated (e.g., pulled-in or post convergence) reference position or coordinates of the mobile receiver near, the tropospheric delay at zenith direction including the a priori model and residual tropospheric delay estimation, and raw phase measurements of the mobile receiver 20 at a first measurement time. The mobile receiver 20, or its relative positioning module 18, is adapted to estimate a relative position or relative position vector between a mobile receiver 20 at a first measurement time and a second measurement time based on a set of real-time kinematic (RTK) algorithm to resolve the L1/L2 double-differenced (DD) fixed integer values ($N_1$, $N_2$) between a reference mobile receiver at carrier frequency L1 and reference satellite per each GNSS system (e.g., GPS or GLONASS) and between a reference receiver 130 at carrier frequency L2 and the same reference satellite per each GNSS system. The double differencing can be used to eliminate receiver clock bias and estimate frequency dependent bias in the carrier phase measurements. The carrier phase measurements at different carrier frequencies (e.g., L1, L2) can be used to estimate or compensate for ionospheric delay.

In step S308 at the mobile receiver 20, the precise positioning module 16 or the backup recovery module 46 applies the relative position vector, the backup data, recovery data, and correction data 108 (e.g., with precise clock and orbit information on the received satellite signals) as inputs, constraints, or both for convergence of one or more predictive filters on wide-lane and narrow-lane ambiguities (e.g., in accordance with a precise positioning algorithm). For example, the rover 20 or its data processor 66, is adapted to compute single-difference (SD) wide-lane ambiguity (e.g., integer ambiguity) based on recovery data, such as a L1/L2 fixed, double-difference (DD) ambiguities associated with an RTK solution (e.g., resolved RTK ambiguity in step S306), and backup data, such as the estimated wide-lane (WL) ambiguities (e.g., floating WL ambiguity) from the data storage device 62, and the refraction-corrected (RC) ambiguities from the data storage device 62. The backup data may comprise any of the following data: the resolved wide-lane (WL) ambiguities, resolved narrow-lane (NL) ambiguities, and the refraction-corrected (RC) ambiguities, and raw phase measurements of the mobile receiver 20. If the backup data includes the resolved NL ambiguities, the related refraction-corrected (RC) ambiguities for the same satellites and measurement times are not required, and vice versa.

After RTK ambiguity resolution is successfully completed for the mobile receiver 20 for at least five GNSS satellites, the mobile receiver 20 can use the recovery data, backup data, and correction data 108 to apply rapid recovery for temporary interruption or loss of one or more received satellite signals. The rapid recovery supports quick, sometimes almost immediate resumption of full ambiguity resolution or precise position estimation of one or more filters (e.g., 38, 40, 44) of the precise positioning module 16. Although only an optional zero-difference filter 38 is shown, the precise positioning module 16 may comprise one or more SD filters, DD filters, or both to support the rapid recovery of the precise position or solution of the mobile receiver 20. In certain embodiments, the rapid convergence may be referred to as Rapid Recovery.

After the constraints of single-differencing wide lane ambiguities, the rover 20 position, tropospheric delay bias and single-differencing narrow-lane ambiguities are applied into the wide-lane filter 40 and narrow-lane filter 44, the post-fit residuals of these constraints (SD WL ambiguities and SD NL ambiguities) can be computed. The ratio of the post-fit residual, or its standard deviation (of SD WL ambiguities or SD NL ambiguities, respectively) divided by the square root of the variance (or standard deviation) of the constraint (SD WL ambiguities or SD NL ambiguities, respectively) can be computed. If that ratio exceeds a large threshold such as three (3), the constraint (SD WL ambiguities or SD NL ambiguities) should be considered problematic. It could be caused by incorrect RTK ambiguity resolution output, for example. The remedy for this issue is to remove the corresponding problematic constraints one-by-one from the solution or position estimate of the navigation positioning estimator 50. An alternative approach is for the navigation positioning estimator 50 to de-weight those problematic constraint(s) by increasing their variance, using the ratio as a scaling factor, for example. Typically, the error checking or error resolution is done in an iterative way.

In step S310 at the mobile receiver 20, the precise positioning module 16 or the navigation positioning estimator 50 estimates a precise position of the rover 20 based on the converged or fixed narrow-lane ambiguities and wide-lane ambiguities. The mobile receiver or the positioning engine can compute an absolute position of the mobile receiver based on the relative position and a reference absolute position of the mobile receiver 20 at the first measurement time or stored in the data storage device 62. The mobile receiver 20, precise positioning module 16 or navigation positioning estimator 50 can estimate a precise position of the mobile receiver 20 based on the converged or fixed narrow-lane ambiguities and wide-lane ambiguities based on the correction data and the backup data. Further, the precise positioning module 16 can estimate wide-lane (WL) ambiguities, refraction-corrected (RC) ambiguities, and tropospheric bias (e.g., mobile tropospheric bias) for the mobile receiver 20 based on the correction data and backup data. The above steps of FIG. 3 are executable or implemented by a data processor 66 of an electronic data processing system 152 of the mobile receiver 20.

Figure 4A:
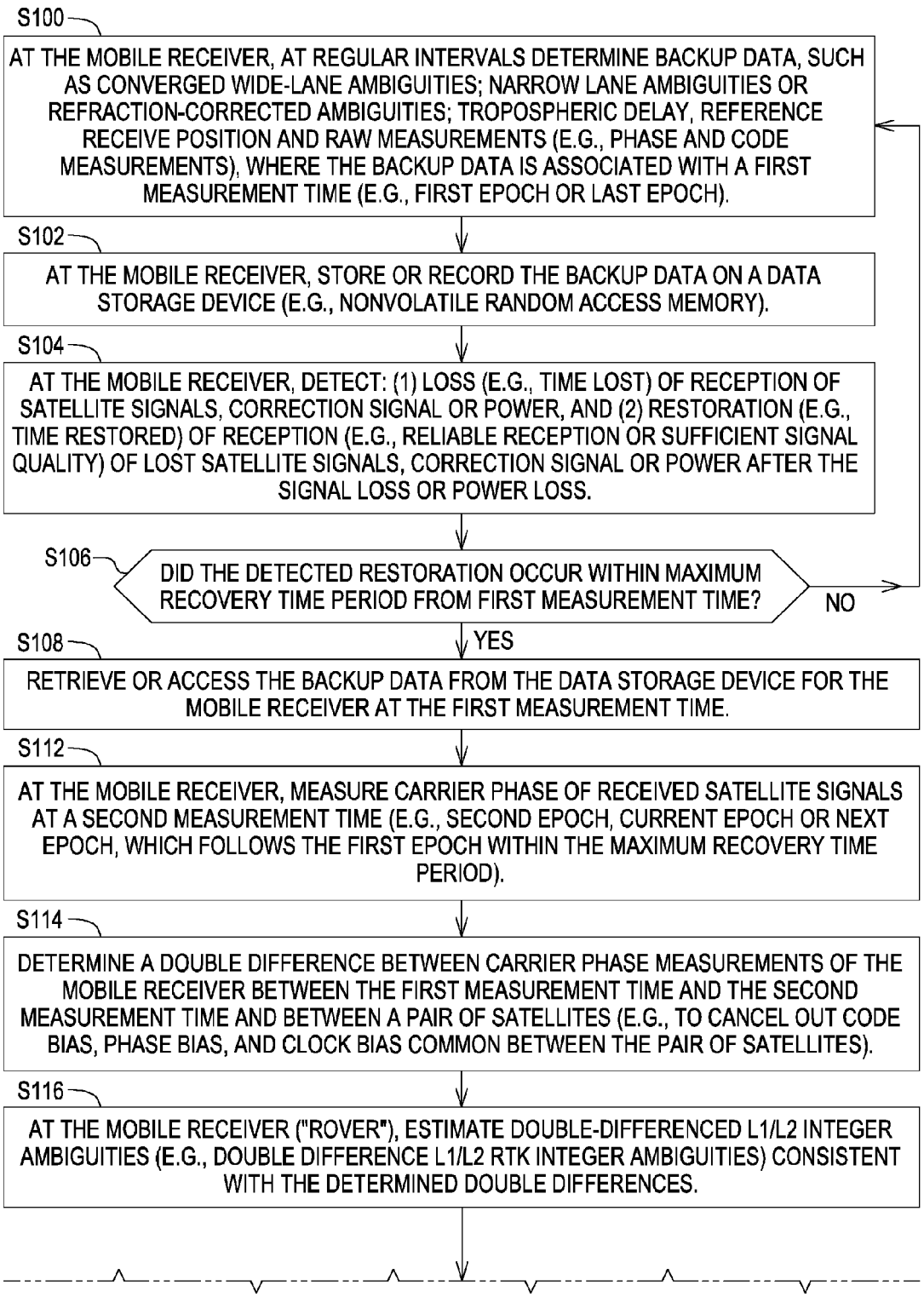
FIG. 4, which comprises FIG. 4A and FIG. 4B, collectively, illustrates another embodiment of method for operating a satellite receiver for rapid determination of precise position by backup data.
Figure 4B:
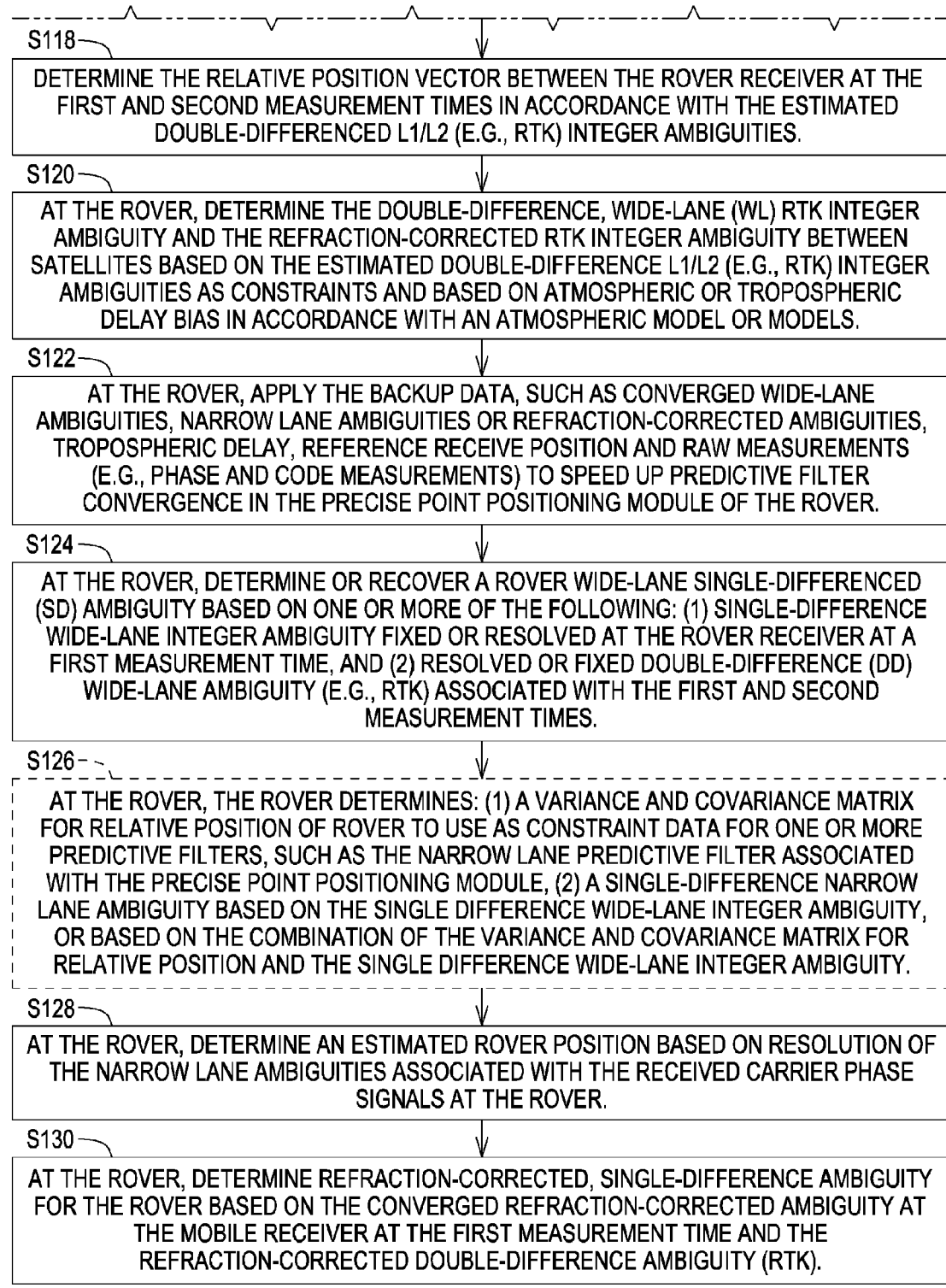

In accordance with one embodiment, FIG. 4, which comprises FIG. 4A and FIG. 4B collectively, discloses a method and satellite receiver for rapid determination of precise position by aiding data 30. The method of FIG. 4 begins in step S101.

In step S100, at regular intervals a mobile receiver 20, a data processor 66 or the precise positioning module 16 (e.g., precise point positioning module) determines backup data, such as converged wide-lane ambiguities; narrow lane ambiguities or refraction-corrected ambiguities; tropospheric delay, reference receive position and raw measurements (e.g., phase and code measurements) for a first measurement time. For example, at regular intervals the mobile receiver 20 or the precise positioning module 16 determines the backup data for a set of received carrier phase signals, received code signals, or both from a set of satellites of one or more GNSS systems (e.g., GPS, GLONASS, and/or Galileo) in accordance with precise point positioning algorithm. First, the precise positioning module 16 may estimate undifferenced or zero-differenced wide-lane ambiguities. Second, the precise positioning module 16 can estimate single-differenced wide-lane (WL) ambiguities. Third, the precise positioning module 16 can use the estimated wide-lane ambiguities as constraints or inputs for estimating the narrow-lane ambiguities. For instance, at the mobile receiver 20, estimating of wide-lane (WL) ambiguities, by a predictive filter (e.g., 38, 40), is based on a LAMBDA (Least-squares AMBiguity Decorrelation Adjustment) or modified LAMBDA procedure to prepare for determination of the narrow-lane ambiguities in integer form (e.g., in accordance with a Best Integer Equivariant (BIE) or modified BIE algorithm). The BIE is a ambiguity resolution or ambiguity fixing technique that can minimize the mean squared error of the integer ambiguities or the real part of the floating solution.

In step S102, the mobile receiver 20, the backup recovery module 46, or the data processor 66 stores or records the backup data on a data storage device 62 (e.g., nonvolatile random access memory). For example, the backup/recovery module 46 or the navigation positioning estimator 50 stores backup data determined in step S100.

In step S104, the mobile receiver 20, cycle slip detector 59, or data processor 66 detects: (1) loss, interruption, disruption, interference, or corruption (e.g., time of loss) of reception of satellite signals by the mobile receiver 20 or of the correction signal, which carries correction data (108), by the correction wireless device 26, or loss or interruption of electrical power to the mobile receiver 20 and/or the correction wireless device 26, and (2) restoration (e.g., time of restoration) of reception (e.g., reliable reception or sufficient signal quality) of lost satellite signals, correction signal or electrical power (e.g., direct current power to mobile receiver 20 from a vehicle) after the signal loss, interruption, disruption, interference, corruption or electrical power loss. The reliable or sufficient signal quality of the received satellite signals, the received correction signal, or both may be determined by any of the following: (a) received signal strength indicator of the received signal, (b) signal quality indicator of the received signal, (c) bit error rate of information encoded (e.g., navigation data, pseudo-range data, or (GPS) coarse-acquisition code data encoded on GNSS carriers) on the received signal, (d) dilution of precision or other figure of merit for the received signal, or (e) loss-of-lock, cycle slips or repeated cycle slips detected by the cycle slip detector 59 during a time interval for the received satellite signal.

In step S106, the mobile receiver 20, backup recover module 46, or data processor 66 determines whether or not the detected restoration occurs within a maximum recovery time period from the first measurement time or after a detection time (e.g., first detection time) of the loss, interruption, disruption, corruption or interference with the received satellite signals, the correction signal or loss of electrical power. If the detected restoration occurs within the maximum recovery time period from the first measurement time or the detection time, the method continues with step S108. However, if the detected restoration does not occur within the maximum recovery time period, the method returns to step S100 because the backup data is regarded as too stale or insufficiently reliable to be used for the rapid recovery process.

In step S108, the mobile receiver 20, backup recovery module 46 or the data processor 66 retrieves backup data from the data storage device 62 for the mobile receiver 20 at the first measurement time.

In step S112, the mobile receiver 20 measures carrier phase of received satellite signals at a second measurement time. For example, the second measurement time refers to a measurement time that follows the first measurement time within the maximum recover time period. In other words, a second epoch, current epoch, or next epoch, follows the first epoch within the maximum recovery time period.

In step S114, the mobile receiver 20, the relative positioning module 18, or the real-time kinematic (RTK) filter 48 determines a double difference between carrier phase measurement of the mobile receiver 20 between the first measurement time and the second measurement time and between a pair of satellites. For example, the mobile receiver 20, the relative positioning module 18, or the real-time kinematic (RTK) filter 48 determines a double difference between carrier phase measurements of the mobile receiver 20 between the first measurement time and the second measurement time and between a pair of satellites to cancel out bias (e.g., code bias, phase bias, and clock bias) common between a pair of satellites and the rover 20 and the reference receiver 130. In step S114, the mobile receiver 20, relative positioning module 18, or navigation positioning estimator 50 determines a set of double differences with respect to multiple respective pairs of satellites observed at the mobile receiver.

In an alternate embodiment, step S114 and step S116 may be combined or executed simultaneously.

In step 116, the mobile receiver 20, relative positioning module 18, or the real-time kinematic (RTK) filter 48 estimates double-differenced L1/L2 integer ambiguities (e.g., double difference L1/L2 RTK integer ambiguities) consistent with the determined double differences (e.g., of step S116). In this document, double-differenced L1/L2 integer ambiguities or real-time kinematic (RTK) double-differenced L1/L2 ambiguities means any of the following: DD L1 RTK integer ambiguities, DD L2 RTK integer ambiguities or both. Step S116 may be carried out in accordance with various techniques, which may be applied separately and cumulatively.

Under a first technique, the mobile receiver 20, relative positioning module 18 or real-time kinematic (RTK) module estimates double-differenced L1/L2 integer ambiguities, such as DD L1 RTK integer ambiguities, DD L2 RTK integer ambiguities or both, by minimizing the error associated with a least squares equation to search for optimal or acceptable integer ambiguity solutions among candidate integer ambiguity solutions.

Under a second technique, the mobile receiver 20, relative positioning module 18 or real-time kinematic (RTK) module estimates double-differenced L1/L2 integer ambiguities by a LAMBDA (Least-squares AMBiguity Decorrelation Adjustment) or modified LAMBDA method. For instance, the error minimization of the least squares equation for decorrelated ambiguities is carried out over a search region determined by a variance and covariance matrix of the ambiguities; floating ambiguity estimates and associated variance/covariance matrices can be used as inputs to the LAMBDA process, where the output is integer ambiguity estimates.

Under a third technique, the mobile receiver 20, relative positioning module 18 or real-time kinematic (RTK) module estimates double-differenced L1/L2 integer ambiguities and ionosphere delay bias per satellite.

In step S118, the mobile receiver 20, relative positioning module 18, or the real-time kinematic (RTK) module determine the relative position vector between the mobile receiver 20 at the first measurement time and the second measurement time in accordance with the estimated double-differenced L1/L2 (e.g., RTK) integer ambiguities, such as DD L1 RTK integer ambiguities, DD L2 RTK integer ambiguities or both. For example, the double-differenced L1/L2 integer ambiguities can be resolved in accordance with Equations 24 and 25. In practice, the relative positioning module 18 can also use the pseudo-range equations (Equations 22 and 23) as constraints to resolve the DD L1 RTK integer ambiguities and DD L2 RTK integer ambiguities.

In step S120, the mobile receiver 20, relative positioning module 18, or the real-time kinematic (RTK) module 48 determine the double difference, wide-lane WL RTK integer ambiguity and the refraction-corrected RTK integer ambiguity between satellites (e.g., in reception range of the reference receiver 130) based on the estimated double-difference L1/L2 (e.g., RTK) integer ambiguities as constraints and based on atmospheric or tropospheric delay bias in accordance with atmospheric models.

In step S122, a mobile receiver 20, its data processor 66 or its precise point positioning module 16 applies backup data (from the data storage device 62), such as converged wide-lane ambiguities; narrow lane ambiguities or refraction-corrected ambiguities; tropospheric delay, reference receive position and raw measurements (e.g., phase and code measurements) to speed up predictive filter convergence in the precise point positioning module 16 of the rover 20. Step S122 may be carried out in accordance with various techniques, which may be applied separately or cumulatively.

Under a first technique, in step S122, a mobile receiver 20, its data processor 66 or its precise point positioning module 16 (e.g., backup/recovery module 46) applies the backup data, such as the resolved double difference wide lane ambiguities (e.g., from step S120), the resolved refraction-corrected RTK integer ambiguity (e.g., from step S120), the relative position vector or relative position (e.g., from step S118) to be used as constraint data for one or more predictive filters (e.g., wide-lane filter 40, narrow-lane filter 44) associated with the precise point positioning module.

Under a second technique for carrying out step S108, a mobile receiver 20, its data processor 66 or its precise point positioning module 16 applies backup data, such as variance and covariance of the ambiguities as constraint data for one or more predictive filters (e.g., wide-lane filter 40, narrow-lane filter 44) associated with the precise point positioning module.

In step S124, a mobile receiver 20, its data processor 66 or its precise point positioning module 16 (e.g., backup/recovery module 46) determines or recovers a rover wide-lane single-differenced (SD) ambiguity based on one or more of the following: (1) single-difference wide-lane integer ambiguity fixed or resolved at the mobile receiver 20 at a first measurement time (e.g., $t_1$), and (2) resolved or fixed double-difference (DD) wide-lane ambiguity (e.g., RTK) associated with the first measurement time and the second measurement time (e.g., satellite-differenced DD wide-lane RTK ambiguities with respect to a pair of satellites and time-differenced with respect to different measurement times).

In optional step S126, a mobile receiver 20, its data processor 66 or its precise point positioning module determines: (1) a variance and covariance matrix for relative position of mobile receiver 20 to use as constraint data for one or more predictive filters, such as the narrow lane predictive filter associated with the precise point positioning module, (2) a single-difference narrow lane ambiguity based on the single difference wide-lane integer ambiguity, or based on the combination of the variance and covariance matrix for relative position and the single difference wide-lane integer ambiguity. For example, the navigation positioning estimator 50 can use the variance to determine standard deviation of the resolved ambiguities or standard deviation of the position estimates to measure the quality of the resolved ambiguities and position estimates. Further, the navigation positioning estimator 50 can use the variance or determined standard deviations decide whether to eliminate or reduce weighting of certain less reliable (or more variable) carrier phase measurements from certain satellites from the final position estimate or solution. Step S126 is optional as indicated by the dashed lines.

In step S128, the mobile receiver 20, its data processor 66 or its precise point positioning module 16 (e.g., backup recover module) may determine an estimated rover position based on resolution of the narrow lane ambiguities associated with the received carrier phase signals at the mobile receiver 20. For example, the precise point positioning module 16 may ignore, discount or reduce the weighting of carrier phase measurements that are determined to be unreliable in optional step S126 to arrive at the estimated rover position.

In an alternate embodiment, step S128 and step S130 may be combined or executed simultaneously.

In step S130, the mobile receiver 20, its data processor 66 or its precise point positioning module 16 may determine refraction-corrected, single-difference ambiguity for the mobile receiver 20 based on the converged refraction-corrected ambiguity of the mobile receiver 20 at the first measurement time and the refraction-corrected double-difference ambiguity (RTK). For example, the tropospheric delay bias of the mobile receiver 20 at the first measurement time approximately equals (e.g., with a tolerance plus or minus five percent) the tropospheric bias of the mobile receiver 20 at the second measurement time, where the first measurement time and the second measurement time are within a maximum time period.

Figure 5:
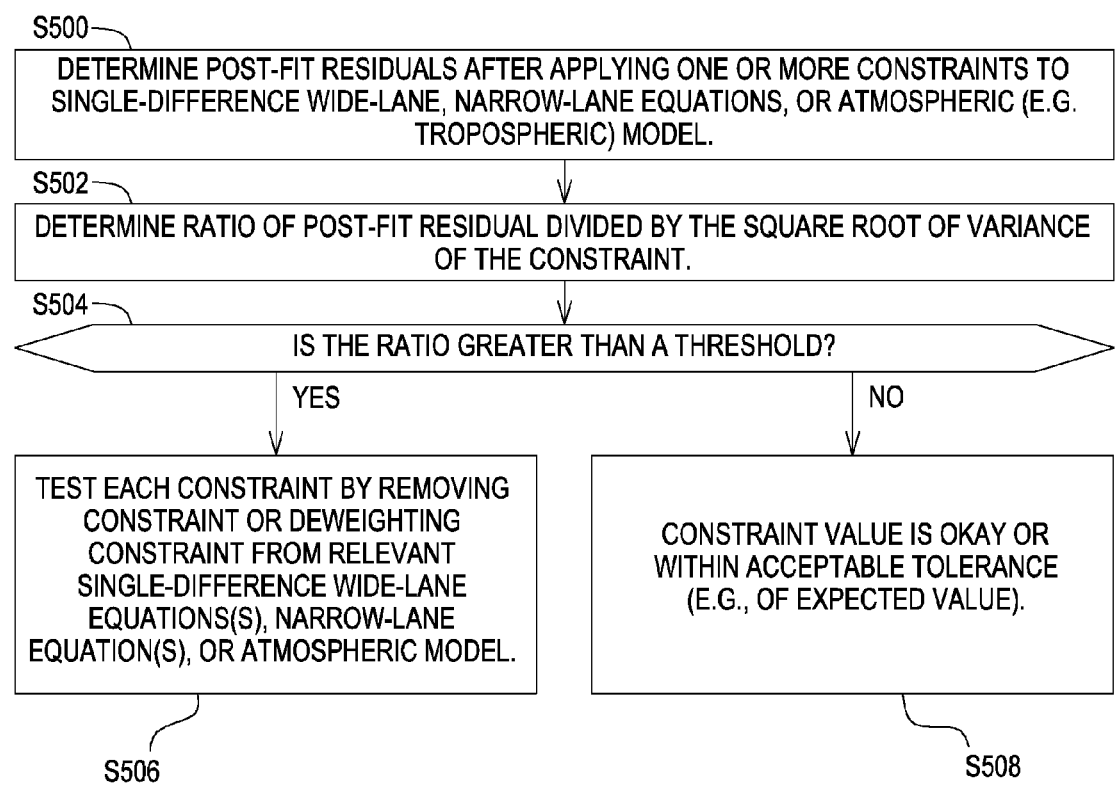
FIG. 5 illustrates one embodiment of method for operating a satellite receiver for rapid determination of precise position by backup data; and, more specifically, for testing constraints for reliability in arriving at a precise position.

FIG. 5 illustrates an optional error checking procedure or method that may be implemented in conjunction with the method of FIG. 3, such as after an iteration of the method or after step S308 or as part of step S126 of FIG. 4B.

In step S500, the navigation positioning estimator 50, the precise positioning module 16, or an error detection module therein, determines post-fit residuals (for the SD WL ambiguities or SD NL ambiguities, respectively) after applying one or more constraints (SD WL ambiguities or SD NL ambiguities, respectively) to single-difference wide-lane, narrow-lane equations, or atmospheric (e.g. tropospheric) model.

In step S502, the navigation positioning estimator 50, the precise positioning module 16 or the error detection module determines ratio of post-fit residual, or its standard deviation, (for the SD WL ambiguities or SD NL ambiguities, respectively) divided by the square root of variance (i.e., standard deviation) of the constraint (SD WL ambiguities or SD NL ambiguities, respectively). The square root of the variance is also referred to as the standard deviation of a variable (e.g., for a normal distribution).

In step S504, the navigation positioning estimator 50, the precise positioning module 16 or the error detection module determines whether or not the ratio greater than a threshold. The threshold may comprise an integer (e.g., 2 or 3) or a real-valued number that is based on empirical data, field testing, a service level for the correction data or the particular mobile receiver 20, or derived from equations that depend upon the current location or geographic zone of a mobile receiver 20. If the navigation positioning estimator 50, the precise positioning module 16 or the error detection module determines that the ratio is greater than the threshold, then the method continues with step S506. However, if the navigation positioning estimator 50, the precise positioning module 16 or the error detection module determines that the ratio is not greater than the threshold (or is equal to the threshold), then the method continues with step S508.

In step S506, the precise positioning module 16 or its components test each constraint by removing the constraint or de-weighting the constraint from relevant single-difference wide-lane equations, narrow-lane equation(s) or atmospheric models. For example, the precise positioning module 16 or the navigation positioning estimator 50 may eliminate, ignore, discount or reduce the weighting of carrier phase measurements that are determined to be unreliable to arrive at the estimated rover position or solution in any of the methods or procedures set forth in this document.

In step S508, the precise positioning module 16 or its components determine that the constraint value is okay or within an acceptable tolerance (e.g., of expected value or error minimization process). For example, the precise positioning module 16 or the navigation positioning estimator 50 may include or maintain the weighting of carrier phase measurements that are determined to be unreliable to arrive at the estimated rover position or solution in any of the methods or procedures set forth in this document.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and The following is claimed:

1. A method for providing or rapidly recovering an estimated position of a mobile receiver, the method comprising execution of the following steps at or by the mobile receiver:
    receiving a set of one or more carrier satellite signals and a correction signal encoded with correction data that is related to the one or more carrier satellite signals;
    measuring the carrier phase of one or more received satellite signals a first measurement time;
    estimating a wide-lane ambiguity and narrow-lane ambiguity in the measured carrier phase of the one or more received satellite signals for the first measurement time and estimating tropospheric bias for one or more of the carrier satellite signals;
    storing, at regular time intervals for the first measurement time, backup data comprising a set of the following post-convergence or resolved values: the estimated wide-lane ambiguities, the estimated narrow-lane ambiguities, the estimated tropospheric delay bias, raw measured carrier phase of the received satellite signals, and corresponding estimated receiver positions;
    detecting a loss of lock on the measured carrier phase associated with loss or lack of reception of one or more of the carrier signals for a loss time period;
    after the detected loss of lock once at least some carrier phase signals are reacquired, measuring the carrier phase of one or more received satellite signals at a second measurement time;
    retrieving or reading the backup data and applying the backup data to a real-time kinematic (RTK) filter to provide a relative position vector between the mobile receiver at the first measurement time and the mobile receiver at the second measurement time and to provide recovery data associated with a satellite-differenced double-difference estimation for the mobile receiver between the first measurement time and the second measurement time;
    applying the relative position vector, the backup data, the recovery data from the RTK filter, and the correction data with precise clock and orbit information on the satellite signals, as inputs, constraints, or both for convergence or resolution of one or more predictive filters on wide-lane and narrow-lane ambiguities in accordance with a precise positioning algorithm;
    estimating a precise position of the mobile receiver based on the resolved narrow-lane ambiguities and wide-lane ambiguities that are in a converged state or fixed state, where the above steps are executable or implemented by a data processor of an electronic data processing system of the mobile receiver; wherein the mobile receiver position at the first measurement time comprises a precise point positioning position of the mobile receiver at the first measurement time, and wherein the recovery data includes one or more of the following: RTK double-difference (DD) wide-lane integer ambiguity, $\nabla \Delta N_{WL}^{ij}$(RTK); RTK fixed refraction-corrected (RC) double-difference (DD) ambiguity, $\nabla \Delta N_{RC}^{ij}$ (RTK); and the relative position between the reference receiver and the mobile receiver, and the variance/covariance of the relative position.

2. The method according to claim 1 wherein the backup data further comprises one or more of the following estimated at the mobile receiver at the first measurement time: fixed wide-lane ambiguities that are fixed to integer ambiguity values, estimated refraction-corrected ambiguities, raw measurements, or tropospheric delay at zenith direction including an a priori model.

3. The method according to claim 1 wherein the recovery data comprises L1/L2 fixed double-difference (DD) ambiguities from the RTK filter at the mobile receiver based on raw phase measurements at the mobile receiver at the first measurement time and the second measurement time for a pair of satellites.

4. The method according to claim 1 wherein applying the backup data to real-time kinematic (RTK) filter further comprises:
    estimating, by the RTK filter, a relative position or the relative position vector of mobile receiver between the first measurement time and the second measurement time based on a set of real-time kinematic (RTK) algorithms to resolve the L1/L2 double-differenced (DD) fixed integer values ($N_1$, $N_2$) at an L1 frequency of the carrier satellite signals and a pair of satellites per Global Navigation Satellite System (GNSS) system and between an L2 frequency of the carrier satellite signals and the same pair of satellites per GNSS system.

5. The method according to claim 1 wherein the resolved values of the wide-lane ambiguities comprise pulled-in or converged wide-lane ambiguities and wherein the resolved values of the narrow-lane ambiguities comprise pulled-in or converged narrow-lane ambiguities from one or more Global Navigation Satellite System (GNSS) satellites' carrier signals at the mobile receiver.

6. The method according to claim 1 wherein estimating the precise position of the mobile receiver further comprises estimating refraction-corrected (RC) ambiguities to the converged state and tropospheric bias for the mobile receiver based on the backup data and the correction data.

7. The method according to claim 1 further comprising:
    at the mobile receiver, estimating of wide-lane (WL) ambiguities, by a predictive filter or wide-lane filter, is based on a LAMBDA or modified LAMBDA procedure to prepare for determination of the narrow-lane ambiguities in integer form.

8. The method according to claim 1 wherein further comprising:
    determining whether a reacquisition or detected restoration of the reception of the carrier phase signals is within a maximum recovery time period prior to applying the real-time kinematic (RTK) filter to resolve ambiguities associated with double-difference carrier phase measurements.

9. The method according to claim 1 wherein, at the mobile receiver at the first measurement time, refraction-corrected ambiguities, ($N_{RC}$) for satellite j are determined based on a Kalman filter in accordance with the following equations after resolving the wide-lane ambiguities:

$$P_{RC}^j = \frac{f_1^2}{f_1^2 - f_2^2}P_1^j - \frac{f_2^2}{f_1^2 - f_2^2}P_2^j = \rho^j + \tau_r + \tau^j + T + \varepsilon_{P_{RC}}^j \text{ and}$$

$$L_{RC}^j = \frac{f_1^2}{f_1^2 - f_2^2}L_1^j - \frac{f_2^2}{f_1^2 - f_2^2}L_2^j =$$

$$\rho^j + \tau_r + b_{NL} + \tau^j + B_{NL}^j + T + (N_{RC}^j + W^j + w)\lambda_{NL} + \varepsilon_{L_{RC}}^j$$

where:
$P_{RC}^j$ is the refraction-corrected phase code for satellite j;
$P_1^j$ is the measured phase code on the L1 frequency for satellite j;
$P_2^j$ is the measured phase code on the L2 frequency for satellite j;
$\varepsilon_{P_{RC}}^j$ is the RC phase code measurement error for satellite j including white noise, multipath and remaining un-modeled errors;
$f_1$ is the L1 carrier frequency and $f_1$ is the L2 carrier frequency of the received satellite signals;
$L_1^j$ is the measured carrier phase for the L1 carrier frequency transmitted from satellite j;
$L_2^j$ is the measured carrier phase for the L2 carrier frequency transmitted from satellite j;
$\rho^j$ is the geometric distance between the satellite j phase center and the receiver phase center including satellite orbital correction, receiver tide displacement and earth rotation correction;
$\tau_r$ is the receiver r clock bias or error for a given GNSS system;
$\tau^j$ is the satellite clock error;
$b_{NL}$ is the receiver narrow-lane phase bias (one per receiver and each constellation for all visible satellites),
$B_{NL}^j$ is the satellite j narrow lane phase bias (one per satellite), which is a RC combination of the L1 satellite phase bias and the L2 satellite phase bias;
T is the tropospheric delay, and is divided into a dry component $T_{dry}$ and a wet component $T_{wet}$;
$W^j$ and w are phase windup errors for both satellite j and receiver, in cycles, respectively, which can be corrected with models;
$N_{RC}^j$ is the refraction-corrected (RC) carrier phase ambiguity term;

$$\lambda_{NL} = \frac{c}{f_1 + f_2}$$

is the narrow lane wavelength;
and
$\varepsilon_{L_{RC}}^j$ is the RC phase measurement error for satellite j including white noise, multipath and remaining un-modeled errors.

10. The method according to claim 1 wherein the resolved double-differenced (DD) L1/L2 integer ambiguities are determined in accordance with the following equations:

$$\nabla \Delta L_1^{ij} = \nabla \Delta \rho^{ij} - \nabla \Delta I^{ij} + \nabla N_1^i \lambda_1^i - \Delta N_1^j \lambda_1^j + \nabla \Delta \varepsilon_{L_1}^{ij}$$

$$\nabla \Delta L_2^{ij} = \nabla \Delta \rho^{ij} - \frac{f_1^2}{f_2^2} \nabla \Delta I^{ij} + \Delta N_2^i \lambda_2^i - \Delta N_2^j \lambda_2^j + \nabla \Delta \varepsilon_{L_2}^{ij}$$

where:
$\nabla \Delta L_1^{ij}$ is the double-difference L1 carrier phase measurements with respect to satellite i and j, the mobile receiver between the first measurement time and the second measurement time;
$\nabla \Delta \rho^{ij}$ is the double-difference geometric distance between the satellite j phase center and a receiver phase center and between satellite i phase center and the receiver phase center, including satellite orbital correction, receiver tide displacement and earth rotation correction;
$\nabla \Delta I^{ij}$ is the double-difference ionosphere error for a given satellite j and satellite i;
$\nabla N_1^i \lambda_1^i$ is the single-differenced integer ambiguity for satellite i multiplied by the wavelength for the L1 carrier from satellite i;
$\nabla N_1^j \lambda_1^j$ is the single-differenced integer ambiguity for satellite j multiplied by the wavelength for the L1 carrier from satellite j;
$\nabla \Delta \varepsilon_{L_1}^{ij}$ is the double-difference phase measurement error for satellite j and satellite i including white noise, multipath and remaining un-modeled errors with respect to the L1 frequency;
$\nabla \Delta L_2^{ij}$ is the double-difference L2 carrier phase measurements with respect to satellite i and j and the mobile receiver between the first measurement time and the second measurement time;
$\Delta N_2^i \lambda_2^i$ is the single-differenced integer ambiguity for satellite i multiplied by the wavelength for the L2 carrier from satellite i;
$\Delta N_2^j \lambda_2^j$ is the single-differenced integer ambiguity for satellite j multiplied by the wavelength for the L2 carrier from satellite j;
$\nabla \Delta \varepsilon_{L_2}^{ij}$ is the double-difference phase measurement error for satellite j and satellite i including white noise, multipath and remaining un-modeled errors with respect to the L2 frequency; and
$f_1$ is the L1 carrier frequency and f2 is the L2 carrier frequency of the received satellite signals.

11. The method according claim 10 wherein after resolution of the double-difference L1/L2 ambiguities in claim 10, RTK wide-lane ambiguities are determined in accordance with the following equation:

$$\nabla \Delta N_{WL}^{ij}(RTK) = \nabla \Delta N_1^{ij} - \nabla \Delta N_2^{ij}$$

where:
$\nabla \Delta N_{WL}^{ij}(RTK)$ is the RTK double-difference wide-lane ambiguity for satellites i and j with respect to the mobile receiver at the first measurement time and the second measurement time;
$\nabla \Delta N_1^{ij}$ is the double-difference L1 wide-lane ambiguity for satellites i and j with respect to the mobile receiver at the first measurement time and the second measurement time; and
$\nabla \Delta N_2^{ij}$ is the double-difference L2 wide-lane ambiguity for satellites i and j with respect to the mobile receiver at the first measurement time and the second measurement time.

12. The method according to claim 1 further comprising providing aiding data comprising refraction-corrected ambiguity between satellite i and j can be derived in accordance with the following equation:

$$\nabla \Delta N_{RC}^{ij}(RTK) = \frac{f_1^2}{f_1^2 - f_2^2} \nabla \Delta N_1^{ij} - \frac{f_2^2}{f_1^2 - f_2^2} \nabla \Delta N_2^{ij}$$

where:
$\nabla \Delta N_{RC}^{ij}$ (RTK) is the RTK refraction-corrected double-difference wide-lane ambiguity for satellites i and j with respect to the mobile receiver at the first measurement time and the second measurement time;
$\nabla \Delta N_1^{ij}$ is the double-difference L1 wide-lane ambiguity for satellites i and j with respect to the mobile receiver at the first measurement time and the second measurement time;

$\nabla \Delta N_2^{ij}$ is the double-difference L2 wide-lane ambiguity for satellites i and j with respect to the mobile receiver at the first measurement time and the second measurement time; and $f_1$ is the frequency of the L1 carrier phase signal and $f_2$ is the frequency of the L2 carrier phase signal.

13. The method according to claim 1 wherein the following parameters of double-difference (DD) wide-lane integer ambiguity, the fixed refraction-corrected ambiguity, the relative position $\Delta X$ and their variance/co-variance are used as additional constraints to speed up a filter convergence process of the one or more predictive filters at the mobile receiver.

14. The method according to claim 1 further comprising: using RTK double-difference wide-lane ambiguities $\nabla \Delta N_{WL}^{ij}(RTK)$ for satellites i and j (with respect to the mobile receiver at the first measurement time and the second measurement time) and the single-difference wide lane ambiguity, $\nabla N_{WL}^{ij}(t_1)$, at the mobile receiver at the first measurement time to derive or estimate the respective single-difference ambiguities, $\nabla N_{WL}^{ij}(t_2)$, at the mobile receiver at a second measurement time in accordance with the following equation:

$$\nabla N_{WL}^{ij}(t_2) = \nabla \Delta N_{WL}^{ij}(RTK) + \nabla N_{WL}^{ij}(t_1).$$

15. The method according to claim 1 further comprising: using an estimated position $X(t_2)$ of the mobile receiver and a corresponding covariance matrix $Q_{XYZ}(t_2)$ for the estimated position of the mobile receiver at the second measurement time as virtual measurements or constraints to be applied to a narrow-lane filter as the one or more predictive filters in accordance with the following equations:

$$X(t_2) = \Delta X_{RTK} - X(t_1) \text{ and}$$

$$Q_{XYZ}(t_2) = Q_{\Delta XYZ(RTK)} \pm Q_{XYZ}(t_1)$$

where:

$\Delta X_{RTK}$ is a relative change in position of the mobile receiver that is observed by the RTK filter between the first measurement time, $t_1$, and the second measurement time, $t_2$;

$X(t_1)$ is the estimated position of the mobile receiver at the first measurement time, $t_1$;

$Q_{\Delta XYZ(RTK)}$ is the change in the covariance matrix associated with the relative change in position $\Delta X_{RTK}$; and $Q_{XYZ}(t_1)$ is the covariance matrix for the estimated position of the mobile receiver at the first measurement time.

16. The method according to claim 1 further comprising: using previously estimated troposphere bias $T(t_2)$ and corresponding covariance matrix $$Q_{T_{t_2}}$$

as virtual measurements or constraints to be applied to a narrow-lane filter as the one or more predictive filters in accordance with the following equations:

$$T(t_2) \approx T(t_1) \text{ and}$$

$$Q_{T_{t_2}} = Q_{T_{t_1}} + \Delta t * q_{Trop}^{Temporal} + |\Delta X_{RTK}| * q_{Trop}^{Spatial}$$

where:

$T(t_2)$ is the estimated tropospheric delay for the mobile receiver at the second measurement time, $t_2$; and $T(t_1)$ is the estimated tropospheric delay for the mobile receiver (e.g., by the atmospheric bias estimator 42) at the first measurement time, $t_1$;

$$Q_{T_{t_2}}$$

is the variance of estimated tropospheric delay at the second measurement time, $t_2$;

$q_{Trop}^{Spatial}$ is a spatial correlation factor for inflating the covariance over spatial displacement of the mobile receiver;

$q_{Trop}^{Temporal}$ is a temporal correlation factor for inflating the covariance over time;

$|\Delta X_{RTK}|$ is traveled distance of the mobile receiver from the first measurement time, $t_1$, to the second measurement time, $t_2$, and $\Delta t = t_2 - t_1$ or the time difference between the first measurement time and the second measurement time.

17. The method according to claim 1 further comprising: using RTK double-difference refection-corrected ambiguities $\nabla \Delta N_{RC}^{ij}(RTK)$ for satellites i and j (with respect to the mobile receiver at the first measurement time and the second measurement time) and the single-difference refraction-corrected ambiguity, $\nabla \Delta N_{RC}^{ij}(t_1)$, at the mobile receiver at the first measurement time to derive or estimate the respective single-difference refraction-corrected ambiguities, $\nabla \Delta N_{RC}^{ij}(t_2)$, at the mobile receiver at a second measurement time in accordance with the following equation:

$$\nabla N_{RC}^{ij}(t_2) = \nabla \Delta N_{RC}^{ij}(RTK) + \nabla N_{RC}^{ij}(t_1).$$

18. A mobile receiver for quickly determining a precise position based on correction data received from a correction data source, the mobile receiver comprising:

a receiver module for receiving a set of one or more satellite signals;

a measurement module for measuring the carrier phase of one or more received satellite signals for a first measurement time;

a correction wireless device for receiving a correction signal related to the set of one or more satellite signals;

an estimator for estimating a wide-lane ambiguity and narrow-lane ambiguity in the measured carrier phase of the one or more received satellite signals for the first measurement time and estimating tropospheric bias for one or more of the carrier satellite signals;

a data storage device for storing, at regular time intervals for the first measurement time, backup data comprising a set of the following post-convergence or resolved values: the estimated wide-lane ambiguities, the estimated narrow-lane ambiguities, the estimated tropospheric delay bias, raw measured carrier phase of the received satellite signals, and one or more corresponding estimated receiver positions;

a detector for detecting a loss of lock on the measured carrier phase associated with loss or lack of reception of one or more of the carrier satellite signals for a loss time period;

after the detected loss of lock once at least some carrier phase signals are reacquired, the measurement module adapted to measure the carrier phase of one or more received satellite signals at a second measurement time;

a real-time kinematic (RTK) filter for using the backup data to estimate a relative position vector between the mobile receiver at the first measurement time and the mobile receiver at the second measurement time and to provide recovery data associated with a satellite-differenced double-difference estimation for the mobile receiver between the first measurement time and the second measurement time;

a navigation positioning estimator for applying the relative position vector, the backup data, the recovery data from the RTK filter, and the correction data with precise clock and orbit information on the satellite signals, as inputs, constraints, or both for convergence or resolution of wide-lane and narrow-lane ambiguities in accordance with a precise positioning algorithm; and the navigation positioning estimator adapted to estimate a precise position of the mobile receiver based on the resolved narrow-lane ambiguities and wide-lane ambiguities that are in a converged state or fixed state, where the above is implemented by a data processor of an electronic data processing system of the mobile receiver; wherein the mobile receiver position at the first measurement time comprises a precise point positioning position of the mobile receiver at the first measurement time, and wherein the recovery data includes one or more of the following: RTK double-difference (DD) wide-lane integer ambiguity, $\nabla\Delta_{WL}^{ij}$ (RTK); RTK fixed refraction-corrected (RC) double-difference (DD) ambiguity, $\nabla\Delta_{RC}^{ij}$ (RTK); and the relative position between the reference receiver and the mobile receiver; and the variance/co-variance of the relative position.

19. The mobile receiver according to claim 18 wherein the correction wireless device comprises a satellite receiver for receiving the correction signals in the L-band.

20. The mobile receiver according to claim 18 wherein the one or more estimated receiver positions comprise a precise point positioning reference position of the mobile receiver that is stationary or mobile at the first measurement time.

21. The mobile receiver according to claim 18 wherein the backup data further comprises one or more of the following estimated at the reference receiver: resolved wide-lane ambiguities, estimated refraction-corrected ambiguities, raw measurements, and tropospheric delay at zenith direction associated with an a priori model.

22. The mobile receiver according to claim 18 wherein the recovery data comprises the L1/L2 fixed DD ambiguities from the RTK filter at the mobile receiver.

23. The mobile receiver according to claim 18 wherein the real-time kinematic (RTK) filter is adapted to estimate a relative position or relative position vector between a mobile receiver at the first measurement time and the second measurement time based on a set of real-time kinematic (RTK) algorithms to resolve the L1/L2 double-differenced (DD) fixed integer values ($N_1$, $N_2$) at an L1 frequency of the carrier satellite signals and a pair of satellites per Global Navigation Satellite System (GNSS) system and between an L2 frequency of the carrier satellite signals and the same pair of satellites per GNSS system.

24. An electronic data processing system for providing rapid position recovery of a rover navigation receiver after partial or full loss of received satellite signals, the system comprising:

a receiver module for receiving a set of one or more satellite signals;

a correction wireless device for receiving a correction signal related to the set of one or more satellite signals;

a measurement module for measuring the carrier phase of each one of the satellite signals in the set with respect to a local reference carrier signal;

an estimation module for estimating a wide-lane ambiguity and narrow-lane ambiguity in the measured carrier phase and tropospheric bias for each carrier signal in the set;

a data storage device for storing, at regular time intervals, backup data comprising post-convergence values of the estimated wide-lane ambiguity, the estimated narrow-lane ambiguity, raw code measurements and raw carrier phase measurements, the tropospheric bias and a corresponding reference position for a first measurement time;

a detector for detecting a loss of lock on the measured carrier phase associated with loss or lack of reception of one or more of the satellite signals for a loss time period; and upon the detected loss of lock after some carrier phase signals are reacquired, a recovery module for recovering an accurate current position estimate, the tropospheric bias, the current wide-lane ambiguity, the current narrow-lane ambiguity based on the stored backup data and observed measurements of the carrier phase of the one or more received satellite signals at a second measurement time to estimate a relative position vector between the mobile receiver at the first measurement time and the mobile receiver at the second measurement time.

25. The electronic data processing system according to claim 24 wherein the recovery module is arranged to process a double-differenced observable for each satellite for the first measurement time, at a last first epoch, prior to the loss of lock and for the second measurement time, at a current epoch during a recovery of the accurate position estimate to precisely estimate the relative position estimate with respect to the last stored reference position.

26. The data processing system according to claim 25 wherein the double-differenced observable comprises carrier phase measurements for L1 frequency or L2 frequency of the received satellite signals, or code phase measurements for L1 frequency or L2 frequency of received satellite signals.

27. The data processing system according to claim 24 wherein the recovery module is arranged to conduct ambiguity resolution to recover wide-lane ambiguity changes and narrow-lane ambiguity changes during a re-convergence time period on the fixed L1 and L2 ambiguities in a real-time kinematic filter.

* * * * *